(12) United States Patent
Wentworth et al.

(10) Patent No.: US 11,573,951 B2
(45) Date of Patent: Feb. 7, 2023

(54) SYSTEMS, METHODS, AND STORAGE MEDIA FOR INTERFACING A USER DEVICE WITH A DECENTRALIZED ARCHITECTURE

(71) Applicant: Curvegrid, Inc., Tokyo (JP)

(72) Inventors: Jeffrey Scott Wentworth, Tokyo (JP); William Henry Metcalfe, Tokyo (JP); Ann Marie Kilzer, Tokyo (JP); Daniel Jacob Briskin, Tokyo (JP); Samuel Howard Schumacker, Tokyo (JP); Pierre Francois Rousset, Tokyo (JP); Daenam Kim, Tokyo (JP)

(73) Assignee: CURVEGRID, INC., Tokyo (JP)

( * ) Notice: Subject to any disclaimer, the term of this patent is extended or adjusted under 35 U.S.C. 154(b) by 497 days.

(21) Appl. No.: 16/677,948

(22) Filed: Nov. 8, 2019

(65) Prior Publication Data
US 2021/0103582 A1 Apr. 8, 2021

Related U.S. Application Data

(60) Provisional application No. 62/909,805, filed on Oct. 3, 2019.

(51) Int. Cl.
*G06F 16/23* (2019.01)
*H04L 67/00* (2022.01)
(Continued)

(52) U.S. Cl.
CPC ............ *G06F 16/2379* (2019.01); *G06F 8/44* (2013.01); *G06F 9/541* (2013.01); *G06F 9/547* (2013.01);
(Continued)

(58) Field of Classification Search
CPC ........ G06F 16/2379; G06F 8/44; G06F 9/541; G06F 9/547; G06F 16/2365; G06F 8/41;
(Continued)

(56) References Cited

U.S. PATENT DOCUMENTS 10,871,948 B1 * 12/2020 Dowling ................. G06Q 20/02
11,182,797 B1 * 11/2021 Perkins .................. G06Q 20/42
(Continued)

OTHER PUBLICATIONS

Pham "Create asp.net Core Web API for Ethereum DApps"), Jan. 2019. (Year: 2019).*
(Continued)

*Primary Examiner* — S. Sough
*Assistant Examiner* — Phuong N Hoang
(74) *Attorney, Agent, or Firm* — Rimon PC; Marc S. Kaufman

(57) ABSTRACT

Systems, methods, and storage media for creating an interface between a smart contract to be executed on a decentralized architecture and a user component, the method comprising: receiving code corresponding to the smart contract at an interface server; the interface server parsing an application binary interface (ABI) corresponding to the smart contract; the interface server constructing an enhanced application binary interface (EABI) based on the ABI; and the interface server creating a REST API interface specific to the smart contract based on the EABI.

30 Claims, 8 Drawing Sheets

(51) Int. Cl.
*G06F 8/41* (2018.01)
*G06F 9/54* (2006.01)
*G06F 8/51* (2018.01)

(52) U.S. Cl.
CPC .......... *G06F 16/2365* (2019.01); *H04L 67/34* (2013.01); *G06F 8/41* (2013.01); *G06F 8/51* (2013.01); *G06Q 2220/00* (2013.01)

(58) Field of Classification Search
CPC ... G06F 8/51; G06F 8/52; H04L 67/34; H04L 67/02; H04L 67/40; G06Q 2220/00
See application file for complete search history.

(56) References Cited

U.S. PATENT DOCUMENTS

| | | | |
|---|---|---|---|
| 2017/0115975 A1* | 4/2017 | Rose | G06F 9/4484 |
| 2017/0272316 A1* | 9/2017 | Johnson | H04L 61/301 |
| 2018/0260909 A1* | 9/2018 | Li | G06Q 20/3827 |
| 2018/0315141 A1* | 11/2018 | Hunn | G06F 16/93 |
| 2019/0340623 A1* | 11/2019 | Rivkind | G06Q 30/0185 |
| 2020/0089720 A1* | 3/2020 | Dallara | G06Q 20/123 |
| 2021/0160069 A1* | 5/2021 | Watanabe | G06F 21/64 |

OTHER PUBLICATIONS

IBM ("Developing PowerPC Embedded Application Binary Interface (EABI) Compliant Programs" pp. 1-8. (Year: 1998).*
Kaleido, ("Simplify blockchain development with powerful APIs", pp. 1-7, Jun. 17, 2019 (Year: 2019).*

* cited by examiner

```
{
    "constant": true,
    "inputs": [
        {
            "name": "_owner",
            "type": "address"
        },
        {
            "name": "_spender",
            "type": "address"
        }
    ],
    "name": "allowance",
    "outputs": [
        {
            "name": "remaining",
            "type": "uint256"
        }
    ],
    "payable": false,
    "stateMutability": "view",
    "type": "function"
},
```

- 302 → "name": "allowance"
- 304 → "type": "uint256"
- 306 → "type": "function"

FIG. 3
(Prior Art)

```
{
"constructor":{},
"methods":{
    "allowance(address,address)": {                    — 402
        "name": "allowance",
        "signature": "allowance(address,address)",
        "const": true,
        "payable": false,                              — 404
        "inputs": [
            {
                "name": "_owner",
                "type": {
                    "type": "address",
                    "size": 20
                },
                "typeConversion": null,
                "summarization": null,
                "notes": ""
            },
            {
                "name": "_spender",
                "type": {
                    "type": "address",
                    "size": 20
                },
                "typeConversion": null,
                "summarization": null,
                "notes": ""
            }
        ],
        "outputs": [
            {
                "name": "remaining",
                "type": {
                    "type": "uint",
                    "size": 256
                },
                "typeConversion": null,
                "summarization": null,
                "notes": ""
            }
        ],
        "author": "",
        "notes": "",
        "returns": "",
        "description": "",
        "cache": false
    }
},
"events": {},
"fallback": null
{
```

SYSTEMS, METHODS, AND STORAGE MEDIA FOR INTERFACING A USER DEVICE WITH A DECENTRALIZED ARCHITECTURE

RELATED APPLICATION DATA

This application claims priority to U.S. Provisional App. Ser. No. 62/909,805 filed on Oct. 3, 2019, the disclosure of which is incorporated herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates to systems, methods, and storage media for interfacing a user device to nodes of a decentralized computing architecture.

BACKGROUND

Decentralized computing architectures, such as blockchain and other distributed ledger technologies, are becoming very popular for a variety of applications where a group of participants share critical data without the need for a central trusted party. For example, decentralized computing architectures have applications in a variety of financial services applications, land records maintenance, supply-chain tracking, and online market places for various goods and services.

Decentralized architectures store a shared ledger on each of multiple nodes associated with various users and thus store data in a manner that is effectively immutable. In other words, information stored on a decentralized architecture, in a practical sense, cannot be changed without detection. A "consensus" mechanism is utilized to ensure that new data added to the ledger of the decentralized architecture is accepted as accurate by the community of users. "Smart contracts" are made up of executable computer code that is stored on a ledger of a decentralized architecture. It follows that smart contracts are tamperproof, in the sense that no party (even their creator) can alter their code or interfere with their execution once they have been stored on the decentralized infrastructure.

Historically, code has run in a centralized manner that leaves the code subject to alteration, termination, and even deletion, by a privileged party. In contrast, the execution of a smart contract is guaranteed, thereby effectively binding all parties to an "agreement" as expressed in the code. For example, a simple smart contract may express an agreement that any value in cryptocurrency sent to a designated cryptographic wallet address on the decentralized infrastructure will be invested in a specific manner. One common blockchain protocol is Ethereum. Ethereum smart contracts, the most common type of smart contract, are typically written in the Solidity programming language and compiled to bytecode and run on Ethereum blockchain nodes. Other programming languages suitable for smart contracts include C++, Simplicity, JavaScript, Python, Vyper and Rholang (for the Rchain environment).

"Decentralized applications" (DApps) are, as the name suggests, applications that run in a decentralized environment. Many DApps consist of an off-chain web or mobile user interface coupled to an on-chain smart contract. As illustrated in FIG. 1, in a typical Ethereum implementation, DApp 112 on user device 110 communicates with one or more of smart contracts 124 on nodes 122 of blockchain 120 via an application programming interface (API), such as the JSON RPC API service 126 running on nodes 122. JSON-RPC is well known and works by sending a method call request to a server implementing the protocol. Multiple input parameters can be passed to the remote method as an array or object, whereas the method itself can return multiple output data. All transfer types are single objects, serialized using JSON.

The web3.js JavaScript library has become the de facto standard for web applications interfacing with Ethereum blockchains using the JSON RPC API. Other decentralized environments utilize a similar API that defines a direct protocol to interface with smart contracts. Any authentication, caching, mixing off-chain and on-chain data, and interfacing with external systems is left up to the application developer and must be included in the web/mobile code of the DApp. This requires each developer to create custom modules for these services. It follows that the modules from various developers may not be compatible. The current state of interface mechanisms between DApp client modules and nodes of distributed architectures is not flexible, easily scalable, or suited for efficient development.

SUMMARY

One aspect of an implementation disclosed herein is a method of creating an interface between a smart contract to be executed on a decentralized architecture and a user component, the method comprising: receiving code corresponding to the smart contract at an interface server; the interface server parsing an application binary interface (ABI) corresponding to the smart contract; the interface server constructing an enhanced application binary interface (EABI) based on the ABI; and the interface server creating a REST API interface specific to the smart contract based on the EABI.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3. illustrates a portion of a conventional ABI data structure in the solc format.

FIG. 4 illustrates a portion of an enhanced ABI data structure in accordance with a disclosed implementation.

FIGS. 7A and 7B illustrate an example of a web-based UI for creating, managing and interacting with event queries.

DETAILED DESCRIPTION

Figure 1:
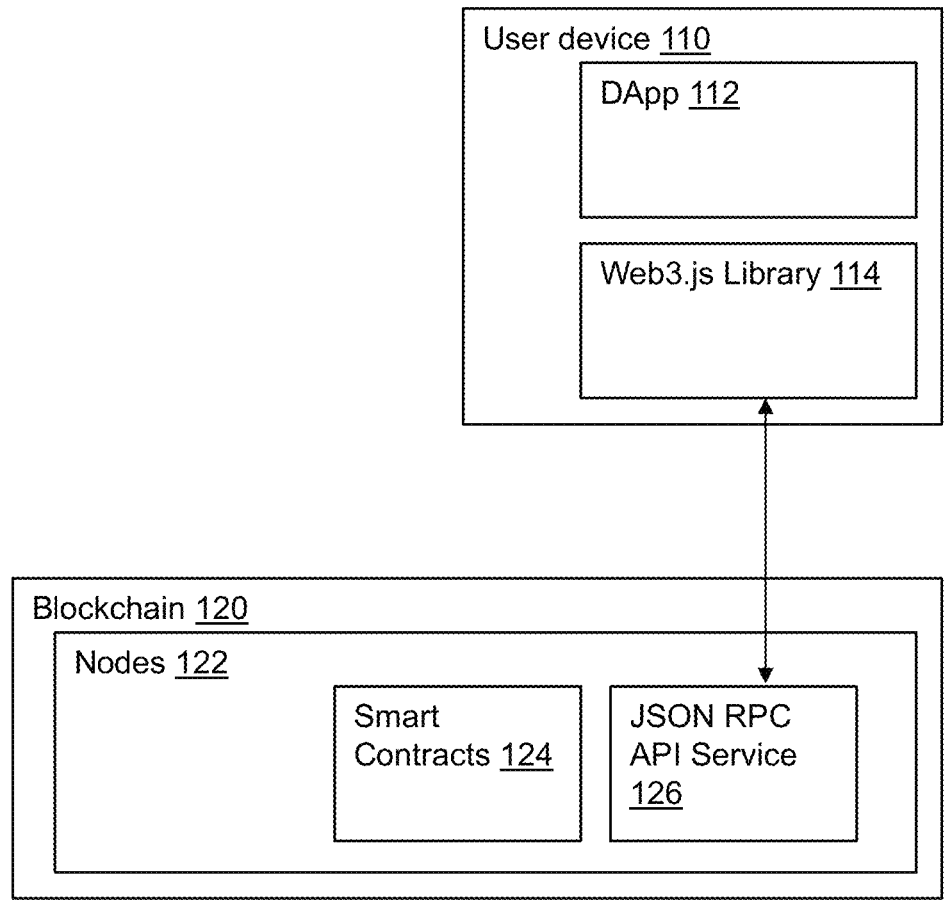
FIG. 1 is a schematic representation of an architecture of a conventional blockchain and user device.

Implementations are described herein using the Ethereum blockchain protocols and Solidity programming language. Therefore, some background on Ethereum protocols and Solidity is presented below. The canonical Solidity compiler is solc (pronounced "solk" or "solsee"). A Solidity smart contract consists of one or more files which are compiled from textual source code into Ethereum Virtual Machine (EVM) executable bytecode and a corresponding solc Application Binary Interface (ABI). For example, the Solidity source code, and descriptive comments, for a smart contract called "Witness" is set forth below with comments.

```
pragma solidity>=0.5.10;

/// @title Witness is a test contract for summarization and bulk transactions
{
  // map of proofs
  mapping (bytes32 => bool) public proofs;
  // events
  /**
  * @dev Signals that a bytes32 proof has been posted to the blockchain.
  * @notice Signals that a proof has been posted to the blockchain.
  * @param notary The address of the notary.
  * @param proof The hashed proof.
  */
  event ProofPosted(address indexed notary, bytes32 indexed proof);
  // notary functions
  /**
  *@dev Post a notarized bytes32 proof (hash of a statement) to the blockchain.
  * @notice Post a notarized proof to the blockchain.
  * @param _proof The keccak256 hash of the statement.
  */
  function postProof(bytes32 _proof) public {
      proofs[_proof] = true;
      emit ProofPosted(msg.sender, _proof);
  }
  /**
  * @dev Hash a statement using the keccak256 hash function.
  * @notice Hash a statement.
  * @param _statement The statement to hash.
  * @return The keccak256 hash of the statement.
  */
  function hashStatement(string memory _statement) public pure returns (bytes32) {
      return keccak256(abi.encode(_statement));
  }
  /**
  * @dev Check a statement against the list of notarized bytes32 proofs.
  * @param _statement The statement to check.
  * @return A Boolean indicating if the proof is present on the blockchain
  */
  function checkStatement(string memory _statement) public view returns (bool)
  {
      bytes32 testProof = hashStatement(_statement);
      return proofs[testProof];
  }
}
```

The corresponding solc ABI is set forth below.

```
[
  {
    "constant": true,
    "inputs": [
      {
        "internalType": "string",
        "name": "_statement",
        "type": "string"
      }
    ],
    "name": "checkStatement",
    "outputs": [
      {
        "internalType": "bool",
        "name": "",
        "type": "bool"
      }
    ],
    "payable": false,
    "stateMutability": "view",
    "type": "function"
  },
  {
    "constant": true,
```

```
        "inputs": [
            {
                "internalType": "bytes32",
                "name": "",
                "type": "bytes32"
            }
        ],
        "name": "proofs",
        "outputs": [
            {
                "internalType": "bool",
                "name": "",
                "type": "bool"
            }
        ],
        "payable": false,
        "stateMutability": "view",
        "type": "function"
    },
    {
        "constant": true,
        "inputs": [
            {
                "internalType": "string",
                "name": "_statement",
                "type": "string"
            }
        ],
        "name": "hashStatement",
        "outputs": [
            {
                "internalType": "bytes32",
                "name": "",
                "type": "bytes32"
            }
        ],
        "payable": false,
        "stateMutability": "pure",
        "type": "function"
    },
    {
        "constant": false,
        "inputs": [
            {
                "internalType": "bytes32",
                "name": "_proof",
                "type": "bytes32"
            }
        ],
        "name": "postProof",
        "outputs": [ ],
        "payable": false,
        "stateMutability": "nonpayable",
        "type": "function"
    },
    {
        "anonymous": false,
        "inputs": [
            {
                "indexed": true,
                "internalType": "address",
                "name": "notary",
                "type": "address"
            },
            {
                "indexed": true,
                "internalType": "bytes32",
                "name": "proof",
                "type": "bytes32"
            }
        ],
        "name": "ProofPosted",
        "type": "event"
    }
]
```

It can be seen that the solc ABI is metadata which describes the functions (sometimes referred to as "methods" herein) and events of the smart contract, including the input and output parameter types of each function. The solc ABI is constructed as an array of objects of one of four different types of constructs that make up a smart contract: 1) constructor (create); 2) fallback (data error); 3) function or 4) event (dispatched signal). The type of each object is distinguishable by its "type" field. For example, in the smart contract above, "checkStatement" is a function.

The Solidity developer documentation and user documentation are created in compliance with the Ethereum Natural Language Specification Format (NatSpec). NatSpec specifies a special form of comments to provide rich documentation for functions and return variables. The comments are intended to be shown to the end user and/or developer (humans) at the time that they will interact with the contract. NatSpec includes the formatting for comments, and corresponding tags, that the smart contract author will use, and which are understood by the Solidity compiler. The Solc compiler can extract the comments and put them into a tagged machine-readable data structure. Of course, the content of the comments themselves are not machine readable. An example of user documentation is set forth below.

```
{
    "methods": {
        "hashStatement(string)": {
            "notice": "Hash a statement."
        },
        "postProof(bytes32)": {
            "notice": "Post a notarized proof to the blockchain."
        }
    },
    "notice": "See provided user documentation for more information."
}
```

Below is an example of the corresponding developer documentation.

```
{
    "author": "Curvegrid Inc.",
    "methods": {
        "checkStatement(string)": {
            "details": "Check a statement against the list of notarized bytes32 proofs.",
            "params": {
                "_statement": "The statement to check."
            },
            "return": "A boolean indicating if the proof is present on the blockchain"
        },
        "hashStatement(string)": {
            "details": "Hash a statement using the keccak256 hash function.",
            "params": {
                "_statement": "The statement to hash."
```

```
        },
        "return": "The keccak256 hash of the statement."
      },
      "postProof(bytes32)": {
        "details": "Post a notarized bytes32 proof (hash of a statement) to the
blockchain.",
        "params": {
          "_proof": "The keccak256 hash of the statement."
        }
      }
    }
  },
  "title": "Witness is a test contract for summarization and bulk transactions"
}
```

It can be seen that the function parameters and return variables are specified in the developer documentation but not in the ABI. Therefore, in order to interface with the smart contract, a developer will also require corresponding user documentation and developer documentation. Further Solidity libraries do not support overloaded functions and events. Many programming language SDKs, such as the Go SDK, use overloading. The Solc ABI provides only the function name, leaving it to the developer to have to "compute" the function signature by looping through inputs array to parse inputs. In Ethereum in particular, this can be very resource intensive.

Implementations disclosed herein include computer architectures and related data structures that provides an interface platform between on-chain data and processing (such as smart contracts) and off-chain data components (such as DApp clients). Various server-side modules can provide other functions as disclosed herein. For example, the operation of blockchain nodes can be automated and secure access to the nodes themselves can be provided.

A standard REST API is constructed to interact with smart contracts. The source code (Solidity code in this example) of a smart contract is uploaded to an interface server and compiled by the interface server into bytecode and a solc ABI. Alternatively, the bytecode and ABI are uploaded to the interface server directly. The solc ABI is parsed by the interface server and an enhanced ABI is constructed. The enhanced ABI is used to dynamically construct a REST API interface specific to each smart contract. This allows developers to use standard REST technologies to interface with smart contracts.

REST is acronym for REpresentational State Transfer. REST is a software architectural style that defines a set of constraints to be used for creating Web services. Web services that conform to the REST architectural style, called RESTful Web services (RWS), provide interoperability between computer systems on the Internet. REST is defined by four interface constraints: identification of resources; manipulation of resources through representations; self-descriptive messages; and, hypermedia as the engine of application state.

RESTful Web services allow the requesting systems to access and manipulate textual representations of Web resources by using a uniform and predefined set of stateless operations. In a RESTful Web service, requests made to a resource's URI will elicit a response with a payload formatted in HTML, XML, JSON, or some other format. The response can confirm that some alteration has been made to the stored resource, and the response can provide hypertext links to other related resources or collections of resources. In contrast, when HTTP is used, the only operations (HTTP methods) available are GET, HEAD, POST, PUT, PATCH, DELETE, CONNECT, OPTIONS and TRACE. By using a stateless protocol and standard operations, RESTful systems provide relatively fast performance, and the ability to reuse components that can be managed and updated without affecting the system as a whole.

By separating the user interface concerns from the data storage concerns, REST improves the portability of the user interface across multiple platforms and improves scalability by simplifying the server components. Requests from a client user device to a server can contain all of the information necessary to understand the request and need not require any stored context on the server. Session state can therefore be maintained entirely on the client. By applying the software engineering principle of generality to the component interface, the overall system architecture of implementations disclosed herein is simplified and the visibility of interactions between a decentralized architecture and an off-chain user device is improved.

An administration web user interface can be built on top of the REST API to provide developers with a facility to easily interact with the interface platform. Interactions with smart contracts can take the form of method calls, or function calls. Read method calls do not modify the state of the blockchain and can be executed entirely on a blockchain node local to the interface platform without having to have the request signed and submitted to the blockchain for approval. Write method calls modify blockchain state and must be signed and submitted to the blockchain for approval. In the case of many blockchains, such as Ethereum, this means including the transaction, which includes the write method call in a block.

Using the interface platform, a read method call might take the form of:

```
/chains/ethereum/contracts/mltitoken/addresses/curvetoken/method/balanceOf
{
  "args": [
    0xbac1cd4051c378bf900087ccc445d7e7d02ad745
  ],
  "from": "0xBaC1Cd4051c378bF900087CCc445d7e7d02ad745"
}
```

Some of the parameters above are dynamic and specific to the smart contract and the blockchain environment it runs in. In the above example, "curvetoken" refers to the smart contract name, and "balanceOf" is the method to call. The "args" array are the parameters to the method, in this case a blockchain address. The "from" parameter is an optional metadata parameter that is made available to the smart contract method. The return value from this function is a JSON data structure such as the data structure bellow.

```
{
   "status": 200
   "message": "Ok"
   "result": 1000
}
```

The result, 1000, is the "balanceOf" the address "0xbac1cd . . . ".

For write methods, it is necessary to sign the transaction with a private key and submit the transaction to the blockchain. The interface platform is built around the principles of decentralization, and the requester can hold the private keys, sign the transaction, and submit the signed transaction directly, or back through the interface platform, to the blockchain for inclusion in a block.

Figure 2:
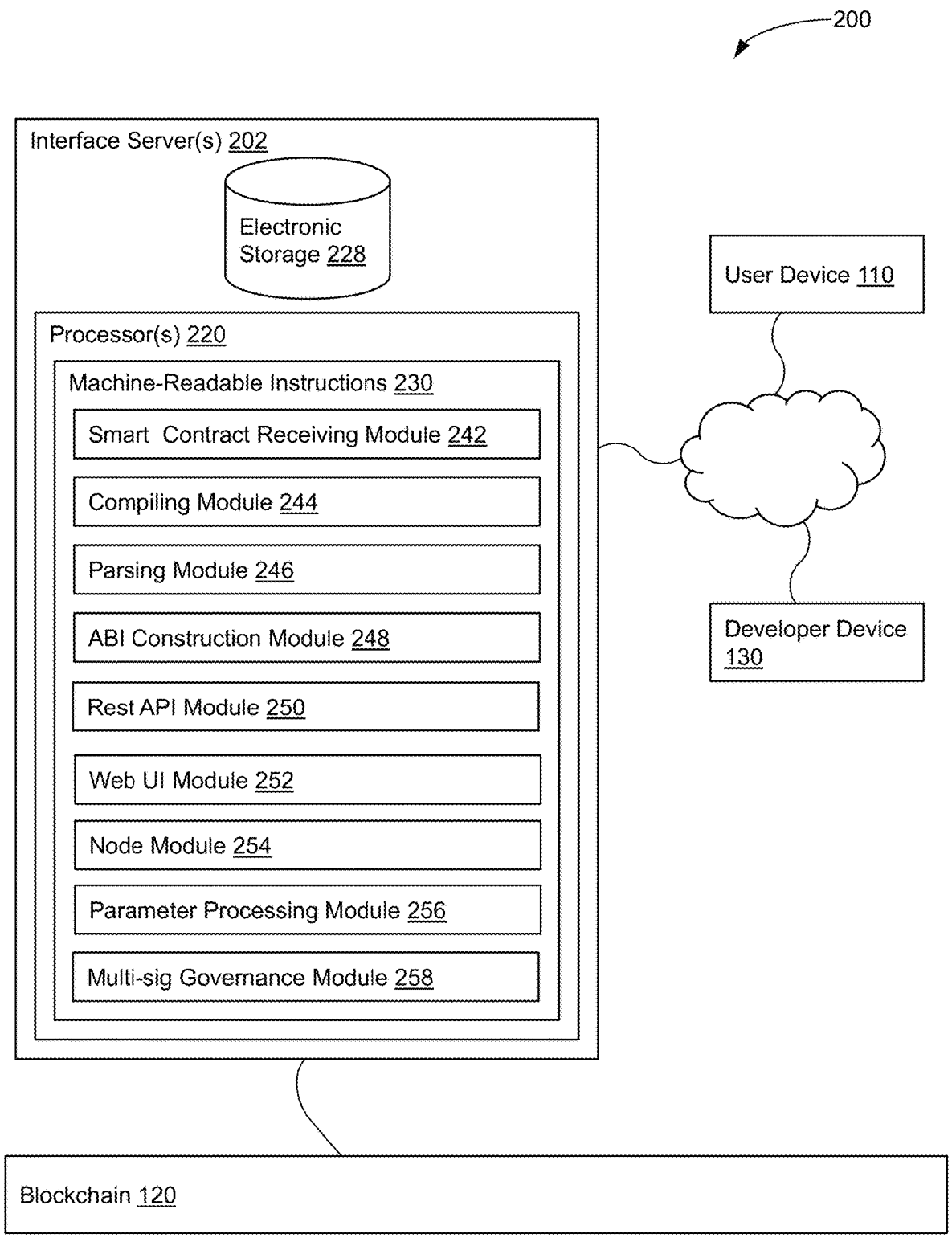
FIG. 2 is a schematic representation of system architecture including a user device, a developer device, a blockchain, and an interface server in accordance with a disclosed implementation.

FIG. 2 illustrates a computer system architecture for interfacing user devices with a blockchain in accordance with one implementation. In some implementations, architecture 200 may include one or more interface servers 202 (which collectively are referred to as an "interface server"). Interface server(s) 202 may be configured to communicate with one or more computing platforms, such as user device 110 and developer device 130 according to a client/server architecture and/or other architectures. User devices 110 and developer devices 130 may be configured to communicate with other computing platforms via server(s) 202 and/or according to a peer-to-peer architecture and/or other architectures. Users, such as those executing a client component of a DApp, may access system 200 via user devices 110. Developers, such as those developing DApps, may access system 200 via developer devices 130. A given user device 110 and/or developer device 130 may include one or more processors configured to execute computer program modules. The computer program modules may be configured to enable a user associated with the given client computing platform 104 and a developer associated with developer device 130 to interface with servers 202, and/or provide other functionality described herein. By way of non-limiting example, the user device 110 and/or developer device 130 may include one or more of a desktop computer, a laptop computer, a handheld computer, a tablet computing platform, a Smartphone, a smartwatch, a gaming console, and/or other computing platforms.

Interface server(s) 202 include computer processor(s) 220 and may be configured by machine-readable instructions 230. Machine-readable instructions 230 are executable by processor(s) 220 and may include one or more instruction modules. The instruction modules may include computer program modules. The instruction modules may include one or more of smart contract receiving module 242, compiling module 244, parsing module 246, ABI construction module 248, rest API module 250, web UI module 252, node module 254, parameter processing module 256, multi-sig governance module 258, and/or other instruction modules.

Smart contract receiving module 242 may be configured to receive, code, such as source code, of a smart contract, such as Solidity code in the case of an Ethereum smart contract. As noted above, a Solidity smart contract consists of one or more files which are compiled from textual source code into Ethereum Virtual Machine (EVM) bytecode and application binary interface (ABI). As an example, a UI can be presented to a developer on developer device 130 to allow the developer to select one or more smart contracts to be downloaded to a server 202 of the interface platform and stored in electronic storage 228.

Smart contract receiving module may also be configured to Validate each downloaded contract. For example, it can be verified that:

the smart contract is in a supported language, such as Solidity—by the function assert (contract.language=="Solidity"), for example;
at least one of the source code or compiled ABI has been downloaded—by the function assert(contract. Source !=nil || contract.ABI !=nil), for example; and
the interface platform can compile/parse the source code, ABI, and bytecode—by the function if contract. Source !=nil {bytecode, abi:=compileSolidity(contract)}, for example;

Compiling module can be configured to compile the source code in a conventional manner into compiled byte code, and ABI, and related documentation. The compiled bytecode, ABI, and documentation can be stored in electronic storage 228 for later use. Multiple versions of a smart contract can be tracked internally. The contracts processed by compiling module 244 are persisted in a database stored in electronic storage 228. Note that in one implementation, either source code is compiled by compiling Module 244, or pre-compiled bytecode and the ABI are received by contract contract receiving module 242 (and compiling module 244 is not required). In the event that both the source code and either the ABI or the byte code are received, the code can be rejected by smart contract reeving module 242 to avoid confusion over intent and precedence.

Parsing module 246 is configured to parse the data structures of the solc ABI the solc developer documentation, and the solc user documentation corresponding to a smart contract. Parsing module 246 can perform all parsing operations required for the data retrieval and manipulation required by ABI construction module 248 and other modules as set for the herein.

ABI construction module 248 requests data from parsing module 246 and creates an enhanced ABI for a specific smart contract based on the solc ABI the solc developer documentation, the solc user documentation and from additional data stored in a database stored in electronic storage 128 of the interface platform. As shown in the example above, the solc ABI includes an array of objects of one of four different types of constructs (constructor, fallback, function or event) that make up a smart contract. The type of each object is distinguishable by its "type" field.

In contrast, the enhanced ABI is an object with four top-level types, each representing one of these four types of constructs (constructor, fallback, function or event). Each type has a different purpose and therefore different metadata parameters which describe it. An example of a portion of the enhanced ABI data structure is below.

```
{
   "constructor": { },
   "function": { },
   "events": { },
   "fallback": null
}
```

The data structure of the enhanced ABI does not confuse parameters and facilitates the inclusion in the data structure of more construct-specific metadata that does not interfere across construct types. The structure of the enhanced ABI allows efficient creation of an API that is more flexible than conventional smart contract APIs. This is discussed in greater detail below.

The enhanced ABI is retrievable (after a smart contract is uploaded and processed by smart contract receiving module 242, compiling module 244, parsing module 246 and ABI construction module 248) by requesting it from the interface platform.

The following is a sample response resulting from the request (for example, "GET/api/v0/contracts/mltitoken") for the details of the "MltiToken" smart contract, which includes its enhanced ABI having a top-level object field for each type of function. In this example, the details for most fields have been collapsed, because the full response could be several thousand lines long. Note also that the solc ABI output is returned as the "rawABI" field for the convenience of the user, such as when third party legacy tools are being used. Note that the empty strings below would typically be populated, but have been omitted herein for brevity.

the solc documentation and ABI must be parsed in order to create a UI or other software communicating with the smart contract. They are different structures and the data therein must be aggregated in a logical manner. In the solc ABI, the parameters related to the arrays of inputs and outputs are in the developer documentation and the user documentation in accordance with the NatSpec standard. Therefore, Solidity libraries do not support overloaded function and events, i.e. functions and events having the same name but different parameters. In order to resolve, an overloaded function in a solc ABI, the developer would have to "compute" a function signature by parsing the documentation and associating the function address and input parameters to the make element shown at 302 in FIG. 3. This would require looping through input arrays to parse the inputs. Each type of input and output would have to be parsed. Since there are over 40 types and there could be many arrays, this parsing could require a relatively large amount of computing resources. For example, the type and size information are conflated, as shown at 304, and the smart contract constructor type is in a type field with other fields either present or not present presented based on the type value, as shown at 306.

```
{
  "status": 200,
  "message": "Success",
  "result": {
    "label": "mltitoken",
    "contractName": "MltiToken",
    "version": "1.0",
    "src": "pragma solidity ^0.5.10; contract {...}",
    "bin": "0x60806040526...",
    "abi": {
      "constructor": {...},
      "methods": {...},
      "events": {...},
      "fallback": null
    },
    "rawAbi": "[{\"constant\":true,\"inputs\":[ ], ...}]",
    "language": "solidity",
    "languageVersion": "",
    "compilerVersion": "",
    "compilerOptions": "",
    "userDoc": "{\"methods\":{ }}",
    "developerDoc": "{\"methods\":{ }}",
    "metadata": "",
    "isFavorite": false,
    "instances": [
      {
        "label": "autotoken",
        "address": "0x9deE62D32898B37F2BDf7e7cB1FA16a45D31D67a"
      }
    ]
  }
}
```

The following is a comparison of a smart contract function named "allowance( )" as it is represented by the solc ABI and the enhanced ABI in accordance with a disclosed implementation. FIG. 3 illustrates the function "allowance( )" in the solc ABI data structure and FIG. 4 illustrates the same function in the enhanced ABI data structure. For the solc ABI, the function allowance( ) would be one of the top-level objects in the ABI "array" as shown at 302 in FIG. 3. In the enhanced ABI, allowance( ) is an object within the top-level "methods" field of objects (see the retrieved example above) as shown at 402 of FIG. 4.

The portion of the enhanced ABI shown in FIG. 4 includes annotations from solc source code parsed by parsing module 246. For each input and output of the function, As shown in FIG. 4., in the enhanced ABI, state and type values are stored in a higher-level key value store. Functions and events of the enhanced ABI are indexed by a unique signature as shown at 402. Attributes are identified by Booleans as shown at 404. When using the enhanced ABI to create an API in the manner discussed below, there is a greatly reduced need for parsing as compared to the solc ABI and related documentation. Therefore, creation of the novel data structure of the enhanced ABI improves the efficiency of a computing device creating an API in the manner described below. Other parameters associated with novel functions of the implementations herein are shown at 406. These parameters are discussed in detail below.

An example of the algorithm executed by parsing module 246 and ABI construction module 248 is described below.

The solc ABI is retrieved from the database. If it is in JSON format, parsing module 246 parse it to a native data structure. ABI construction module 248 retrieves the solc developer and user documentation from the database and parsing module 246 parses the data structures. ABI construction module initializes the enhanced ABI data structure including the objects and ontology described above. ABI construction module 248 then causes parsing module 246 to loop through the objects in the array that makes up the solc ABI and assign them as appropriate to the enhanced ABI. The developer and user documentation, and enriched metadata in the database, such as type conversion, summarization, method call, and caching, are assigned to appropriate objects in the enhanced ABI. The enriched metadata is described in more detail below. The result is the enhanced ABI data structure corresponding to the solc ABI for a specific smart contract. The enhanced ABI can be stored in a database in electronic storage 228 of interface server(s) 202 in correspondence to other files and information related to the smart contract, including the code of the smart contract.

Figure 5:
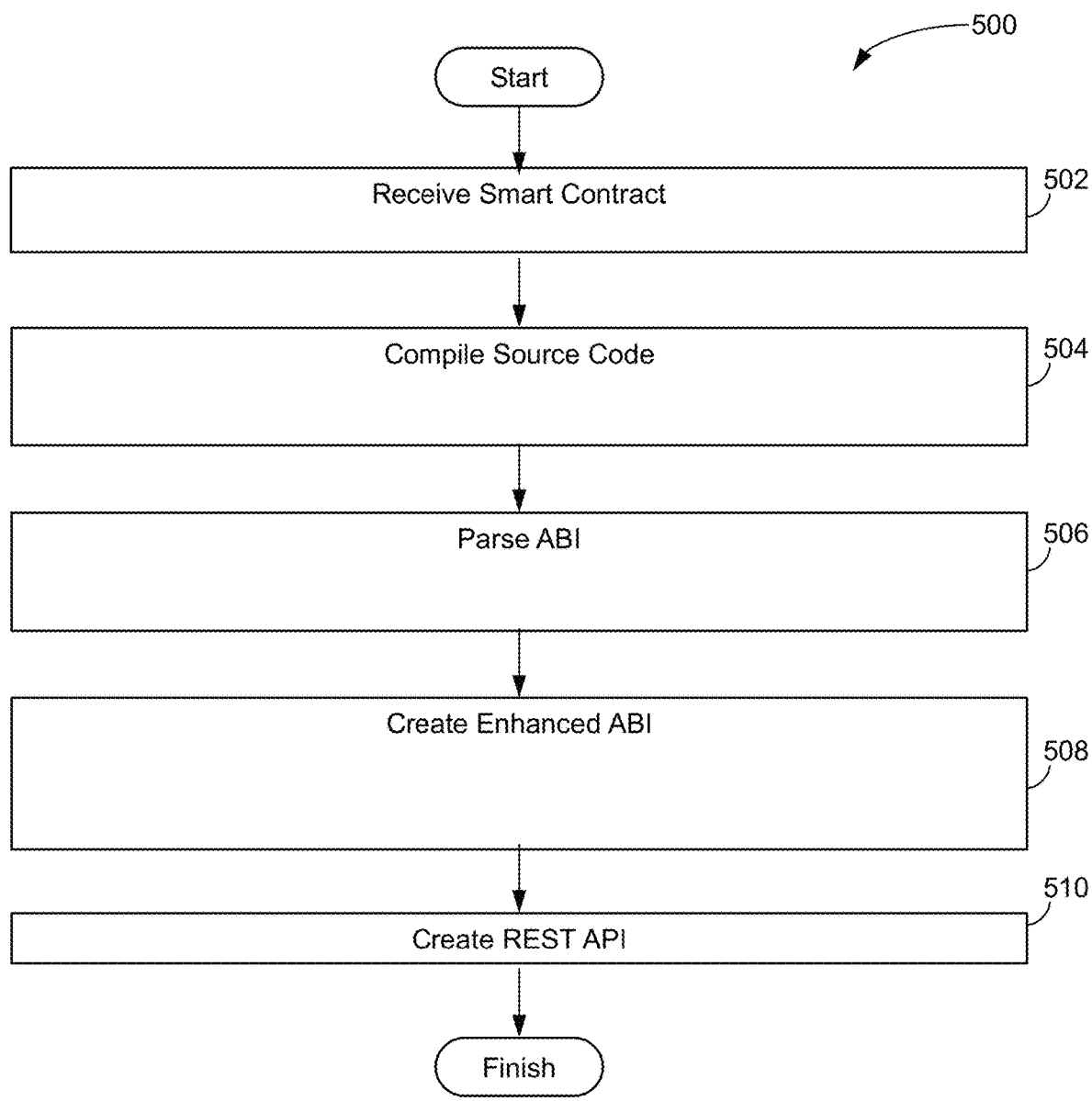
FIG. 5 is a flow chart of a method for creating an API in accordance with a disclosed implementation.

FIG. 5 illustrates a method 500 for creating a REST API for interfacing a user device with a distributed computing architecture. The operations of method 500 presented below are intended to be illustrative and can include all of the functions described above in connection with architecture 200. In some implementations, method 500 may be accomplished with one or more additional operations not described, and/or without one or more of the operations discussed. Additionally, the order in which the operations of method 500 are illustrated in FIG. 4 and described below is not intended to be limiting, unless expressly articulated as such.

In some implementations, method 500 may be implemented in one or more processing devices (e.g., a digital processor, an analog processor, a digital circuit designed to process information, an analog circuit designed to process information, a state machine, and/or other mechanisms for electronically processing information). For example, method 500 can be implemented by architecture 200 of FIG. 2 The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 receives a smart contract in source code or bytecode with documentation. This operation can be similar to the functions described with respect to smart contract receiving module 242. If the smart contract is received as source code, an operation 504 can compile the source code. This operation can be similar to the functions described with respect to smart contract compiling module 244. An operation 506 can include parsing an application binary interface (ABI) corresponding to the smart contract. This operation can be similar to the functions described with respect to parsing module 246. An operation 508 can create an enhanced ABI. This operation can be similar to the functions described with respect to ABI construction module 248. An operation 510 can create and execute a REST API interface specific to the smart contract based on the enhanced ABI. This operation can be similar to the functions described with respect to the REST API module 250.

Returning to FIG. 2, REST API module 250 is operative to create and execute a RESTful API for communications between a user device 110 (FIG. 1) and Server(s) 202 of interface platform 200. There are two types of smart contract method calls: those that do not change the blockchain state, and those that do change the blockchain state. The first type can be thought of as read method calls, and the latter as write method calls. Read method calls return a value immediately and are evaluated entirely within local node module 254 (which can include an instance of a node of blockchain 120 and other processing as described below). Write calls generate a blockchain transaction that must be signed, submitted to blockchain 120 through node module 254, and included in a block based on a consensus algorithm of blockchain 120). Once a transaction is included in blockchain 120, the state of blockchain 120 has been updated to reflect the effects of the write call.

With the smart contract code stored in the database, Rest API module 250 composes a valid deployment transaction and returns this to the user device 110. In the case of Ethereum, this is a smart contract transaction directed to a null address instead of an existing smart contract address. The transaction data field is the bytecode of the smart contract, with the constructor parameters appended. Server(s) 202 accept the constructor parameters in the body of the deployment REST API call.

The following is a sample REST API call to deploy a smart contract and the corresponding response.

```
POST . . ./contracts/mltitoken/1.0/deploy
  Request:
  {
    "args": [
       "0xF9450D254A66ab06b30Cfa9c6e7AE1B7598c7172"
    ],
    "from": "0xF9450D254A66ab06b30Cfa9c6e7AE1B7598c7172",
    "signer": "0xF9450D254A66ab06b30Cfa9c6e7AE1B7598c7172",
    "signAndSubmit": true
  }
  Response:
  {
    "status": 200,
    "message": "Success",
    "result": {
       "tx": {
          "from": "0xF9450D254A66ab06b30Cfa9c6e7AE1B7598c7172",
          "value": "0",
          "gas": 1988176,
          "gasPrice": "1",
          "data": "0x6080604052600a<. . .ommitted. . .>1b7598c7172",
```

```
        "nonce": 4,
        "hash":
"0x6db3a2564ab7aaba5cf2ff6ae206aba6197e29b180ce646db4ffd669657bbb91"
      },
      "submitted": true,
      "summarizedInputs": [
        null
      ],
      "deployAt": "0xB98e9bFF193adB14f75821D638F8Fc34F07E6c1C",
      "label": "mltitoken"
    }
  }
```

Note the single constructor argument, the address of the owner of the deployed contract, is passed in "args". The unsigned transaction is returned, along with the predicted deployment address. This is a convenience feature and is not generally returned by other web3 implementations. It can be computed deterministically from the "from" address and its nonce. The REST API also can have the ability to link a smart contract to external libraries, or other external sources such as "oracles" during deployment.

The effect of linking a smart contract to an address informs server(s) 202 that the bytecode on the blockchain at that address can be interacted with via the methods in that smart contract. Multiple smart contracts (via, the corresponding ABIs) can be linked to a single blockchain address. This allows a layering of functionality, where a smart contract developer can choose which contract's ABI is to be used to access a deployed contract instance. Similar to C header (.h) files, a contract that contains the methods within that header file can be interacted with, even if it contains additional functionality not specified in a given header file (i.e., in a given ABI).

For example, the ERC20 token standard defines a series of Solidity methods that a smart contract must implement but does not limit the smart contract from implementing additional functionality.

Linking a deployed smart contract to an address can be performed with the following REST API call.

```
Request:
POST . . ./chains/ethereum/addresses
{
    "address": "0xB98e9bFF193adB14f75821D638F8Fc34F07E6c1C",
    "label": "mltitoken"
}
Response:
{
    "status": 200,
    "message": "Success",
    "result": {
        "label": "mltitoken",
        "address": "0xB98e9bFF193adB14f75821D638F8Fc34F07E6c1C",
        "balance": 0,
        "chain": "ethereum",
        "isContract": true,
        "modules": [ ],
        "contracts": [
            {
                "name": "",
                "label": "mltitoken",
                "conflict": false,
                "version": "1.0"
            }
        ]
    }
}
```

As noted above, node module 254 can be a node of blockchain 120 and thus is operative to interface server(s) 202 with other nodes of blockchain 120. Conventionally, signing a transaction to be recorded on blockchain 120 often involves some kind of user interaction. For example, with a web3 browser plugin such as MetaMask™, the user is presented with a popup requesting them to review the details of a transaction and signal assent by clicking a button. Signing could involve additional interaction, such as entering a password for a private key or entering a PIN on a hardware wallet connected via USB. Below is an example of a read request, in accordance with an implementation of the REST API, against an instance of the "witness" smart contract. In the example smart contract, the string "Hello world" is an input and the output is the Keccak256 hash (similar to SHA3-256) of the string.

```
POST
.../chains/ethereum/addresses/witness/contracts/witness/methods/hashStatement
{
  "args": [
    "Hello world"
  ]
}
```

The response to this request is below.

```
{
  "status": 200,
  "message": "Success",
  "result": {
    "output": "0x8e8ec4df0ffb4485da035428c5efbf1741f4cb4523e64cd434b173d73605e879",
    "summarizedInputs": [
      null
    ]
  }
}
```

Note the direct return value of 0x8e8ec4df . . . 73605e879", the Keccak256 hash of the string "Hello world". This is the output of the smart contract and could be computed by the blockchain node (node module 254). In contrast, calling postProof( ), a write method shown below, returns an unsigned transaction. In this example, a single argument is passed as the input to a function, a bytes32 value (fixed-size array of 32 bytes) as hexadecimal, the same one generated by hashStatement( ). The "from" address indicates the address that will sign the transaction.

```
POST
.../chains/ethereum/addresses/witness/contracts/witness/methods/postProof
{
  "args": [
    "0x8e8ec4df0ffb4485da035428c5efbf1741f4cb4523e64cd434b173d73605e879"
  ],
  "from": "0xF9450D254A66ab06b30Cfa9c6e7AE1B7598c7172"
}
```

The response is an unsigned transaction which can be signed and submitted to the blockchain as shown below.

```
{
  "status": 200,
  "message": "Success",
  "result": {
    "tx": {
      "from": "0xF9450D254A66ab06b30Cfa9c6e7AE1B7598c7172",
      "to": "0xfd8095F76B9ecD81F5F5571646Fa51ff127F8598",
      "value": "0",
      "gas": 45543,
      "gasPrice": "1",
      "data": "0xf64e88c08e8ec4df0ffb4485da035428c5efbf1741f4cb4523e64cd434b173d73605e879",
```

```
        "nonce": 9,
        "hash":
"0x87e6324726a06856eaf849cd8adb2c84d68226f0d32b4b4d83e3fe9415ede70a"
      },
      "submitted": false,
      "sum marizedInputs": [
        null
      ]
    }
  }
}
```

Note the following related to the solc ABI encoding of the parameters passed in the "data" field:

0xf64e88c0: the function selector, which is the first four bytes of the Keccak256 hash of the Solidity method signature. Explicitly: 0xf64e88c0=keccak256("postProof(bytes32)")[0:4]

0x8e8ec4df0ffb4485da035428c5efbf1741f4cb4523e64cd434b173d73605e87 9: the 32 byte input value, which is the Keccak256 hash of the string "Hello world", as previously computed.

In the case of posting a single proof, requiring the user to sign the transaction might not be overly burdensome. However, in the case of posting 1,000 or 10,000 proofs to the blockchain, it is not pragmatic to require a user to manually sign these many transactions. There are various strategies to cope with this, including delegating the signing key to automation. However, REST API module 250 supports another signing mechanism referred to as "method caching" herein. This allows a user to buffer transactions in server(s) 202, and optionally sign them later. To make use of this feature, a user: 1) enables method caching for the desired write method; 2) makes one or more calls to the write method; 3) optionally retrieves the cached methods for review or signing; and 4) signs one or more of the cached methods and submits them to the blockchain. Method caching can be enabled through additional metadata (see 406 of FIG. 4).

With caching enabled, any previously cached method calls can be retrieved. An example request is below.

```
POST. . ./contracts/witness/1.0/methods/postProof
{
  "inputs": [
    {
```

```
        "typeConversion": null
      }
    ],
    "cache": true
}
```

The response could look like this.

```
{
  "status": 200,
  "message": "Success"
}
```

An example algorithm for implementing transaction caching is set forth below.

Load the MultiBaas ABI for the smart contract method
proceed if caching is enabled for this method, and it is a
  Create a cached method call including the destination address, the from address, transaction data and a transaction hash, for example:

```
call := new CachedMethodCall{
Method: method.name,
Address: instance.address,
FromAddress: transaction.from,
TXData: transaction.data,
TXHash: transaction.hash
}
```

Insert the cached method call record to the database; and
Cache the individual parameter values in association with the cached method call If this transaction is then signed and submitted to blockchain 120 and included in a block of blockchain 120 based on the appropriate consensus mechanism, a subsequent query for cached method calls will cause the following response.

```
{
  "status": 200,
  "message": "Success",
  "result": {
    "results": [
      {
        "from": "0xF9450D254A66ab06b30Cfa9c6e7AE1B7598c7172",
        "txData":
"0xf64e88c08e8ec4df0ffb4485da035428c5efbf1741f4cb4523e64cd434b173d73605e879",
        "txHash":
"0x87e6324726a06856eaf849cd8adb2c84d68226f0d32b4b4d83e3fe9415ede70a",
        "createdAt": "2019-08-28T17:50:16.353306+09:00",
        "parameters": [
          {
            "originalValue":
"0x8e8ec4df0ffb4485da035428c5efbf1741f4cb4523e64cd434b173d73605e879"
          }
```

```
            ],
            "onChain": {
                "txHash":
"0x368c8b02fd6cd102946874dd437faec28a2e7f68f15c872eb3d9d098e82c5683"
,
                "blockHash":
"0xdcc6ac186e66b68c81d0e10b6080be0fd2b61b4e9b79d088419a1573575dd24
3",
                "blockNumber": 20,
                "indexInBlock": 0,
                "triggeredAt": "2019-08-28T17:53:43+09:00",
                "isBulkTransaction": false
            },
            "isBulk": false
        }
    ]
  }
}
```

The "onChain" field above contains details of the transaction that is present on the blockchain. An example of an algorithm for retrieving cached method calls from the database is as follows.

Retrieve the cached method calls from the database, along with the corresponding cached parameter values Create a map of the calls for lookup, where the key is a combination of the from address and the transaction data Combine with corresponding on-chain blockchain events data, if any Create a map of the events for lookup, where the key is a combination of the from address and the transaction data Track the hashes of transactions already processed Collect the events and populate on-chain information Parse through events and attempt to match each event to the earliest matching call (since each event and call is visited (at most) once, the complexity is O(N+M) (number of calls+number of events) (the number of events is at most the number of calls for event Skip if the call time is before the event time Skip if the event has already been processed Process this event Turn the event into an on-chain structure calls[currentCall].OnChain=event.toOnChain( )

Caching method calls defers the signing of transactions to a later time. Another strategy for handling large number of signing requests in an efficient manner is to "summarize" them into a single bulk transaction. Node module 254 is also configured to handle this task. Summarizing can be enabled through additional metadata (see 406 of FIG. 4).

An example of an algorithm for summarizing multiple transactions is set forth below.

Cache a series of method calls

Query the method calls

Optionally, select a subset of the method calls

Summarize the method calls along a single parameter into a bulk transaction

Sign the bulk transaction and submit it to the blockchain

The summarization function can be, for example, Keccak256 (similar to SHA3-256). Summarization could include an address+secret hash generator. Further, this could be combined with the transaction caching "store" functionality to create a friendlier hash table/map interface into the cached data.

The summarization function can be enabled for one or more method input parameters. In the example, the summarization function is enabled for the "proof" parameter of the postProof( ) method. An example API request is below.

```
POST .../contracts/witness/1.0/methods/postProof
{
    "inputs": [
        {
            "typeConversion": null,
            "summarization": {
                "mode": "keccak"
            }
        }
    ],
    "cache": true
}
```

The response could be:

```
{
    "status": 200,
    "message": "Success"
}
```

Note that, in the example above, caching has also been enabled for this method. However, caching is not required in order to use summarization. If an API request is made to the postProof( ) method, the un-hashed raw string, not a pre-hashed string as in earlier examples, is passed. Node module 254 will automatically summarize (Keccak256 hash) the input value. In this example, the input value is the string "Hello world". Such a request is shown below.

```
POST
.../chains/ethereum/addresses/witness/contracts/witness/methods/postProof
{
    "args": [
        "Hello world"
    ],
    "from": "0xF9450D254A66ab06b30Cfa9c6e7AE1B7598c7172"
```

```
}
The resulting response is shown below.
{
  "status": 200,
  "message": "Success",
  "result": {
    "tx": {
      "from": "0xF9450D254A66ab06b30Cfa9c6e7AE1B7598c7172",
      "to": "0xfd8095F76B9ecD81F5F5571646Fa51ff127F8598",
      "value": "0",
      "gas": 45543,
      "gasPrice": "1",
      "data": "0xf64e88c086e736fc3b0f39bff1edc8267c1de04e197cdf0ebddaec6b55848297ab5cf1fe",
      "nonce": 10,
      "hash": "0x67baf6f60d9974cfe039976b97a1629668fbb072276ce8888c14e3b9af11cd0c"
    },
    "submitted": false,
    "summarizedInputs": [
      "\"Hello world\""
    ]
  }
}
```

In addition to an unsigned transaction, node module 254 also returns the summarized inputs, which is the pre-hashing value as interpreted. Values to be summarized can be taken to be JSON values, so in this case, node module 254 has added quotation marks around the string: "\"Hello world\"". Note the solc ABI encoding of the "data" field includes the following:

0xf64e88c0: the function selector, which is the first four bytes of the Keccak256 hash of the Solidity method signature. Explicitly: 0xf64e88c0=keccak256("postProof(bytes32)")[0:4]

0x86e736fc3b0f39bff1edc8267c1de04e197cdf0ebddaec6b55848297ab5cf1fe: the 32 byte input value, which is the Keccak256 hash of the string "\"Hello world\"" (including quotation marks).

Summarized inputs have additional properties which can be expressed by passing in a JSON object in response to, for example, the request shown below.

```
POST
.../chains/ethereum/addresses/witness/contracts/witness/methods/postProof
{
  "args": [
    {
      "userID": 123,
      "productOrdered": "Apples"
    }
  ],
  "from": "0xF9450D254A66ab06b30Cfa9c6e7AE1B7598c7172"
}
```

The response is shown below.

```
{
  "status": 200,
  "message": "Success",
  "result": {
    "tx": {
      "from": "0xF9450D254A66ab06b30Cfa9c6e7AE1B7598c7172",
      "to": "0xfd8095F76B9ecD81F5F5571646Fa51ff127F8598",
      "value": "0",
      "gas": 45543,
      "gasPrice": "1",
      "data": "0xf64e88c0483293280cdbf2c26924313d570d179922e11236074a606d3c7fca057199206e",
      "nonce": 10,
      "hash": "0x0b657131851ff8aec13ad2f0aa0402d51ce747ff7ae67c0970daa6ad1c1b4560"
    },
    "submitted": false,
    "summarizedInputs": [
```

```
        "{\"ProductOrdered\":\"Apples\",\"userID \":123}"
      ]
    }
}
```

Note the different hash in the transaction data field ("83293280c . . . ") of the response, as the response has of the JSON object passed in to the request as the "proof" parameter to the function postProof( ). Furthermore, node module 254, in this implementation, returns the summarized inputs as a string representation of the JSON object, with all the whitespace removed, and all of the hash entries recursively sorted alphabetically by their keys (e.g., "productOrdered" comes before "userID"). As the hash (summarization) will be highly dependent on the exact input bytes, a deterministic input produced and returned to the user in case they wish to record it for later reference.

Two more example transaction requests (responses omitted) can be used to call the method postProof( )

```
Additional request #1
POST. . ./chains/ethereum/addresses/witness/contracts/witness/methods/postProof
{
    "args": [
      {
        "userID": 123,
        "productOrdered": "Oranges"
      }
    ],
    "from": "0xF9450D254A66ab06b30Cfa9c6e7AE1B7598c7172"
}
Additional request #2
POST
. . ./chains/ethereum/addresses/witness/contracts/witness/methods/postProof
{
    "args": [
      {
        "userID": 456,
        "productOrdered": "Apples"
      }
    ],
    "from": "0xF9450D254A66ab06b30Cfa9c6e7AE1B7598c7172"
}
```

Assuming that these three requests have been issued and cached. These requests can be retrieved with the following request (the corresponding response is shown below the request.

```
Request
POST. . ./chains/ethereum/addresses/witness/contracts/witness/methods/postProof/transactions
{ }
Response
{
    "status": 200,
    "message": "Success",
    "result": {
      "results": [
        {
          "from": "0xF9450D254A66ab06b30Cfa9c6e7AE1B7598c7172",
          "txData":
"0xf64e88c0f31640128a1929c2d0ea453cb3ea3fbb15c0119112829b1135f47e21a9a8c5d9",
          "txHash":
"0xf3c8f78fa8835b1abdf4479c96b0170ac23af8dada8e93795651250059c2a570"
,
          "createdAt": "2019-08-29T02:13:47.521503+09:00",
          "parameters": [
            {
              "originalValue": {
                "userID": 456,
                "productOrdered": "Apples"
              }
            }
          ],
          "onChain": null,
```

```
            "isBulk": false
        },
        {
"from": "0xF9450D254A66ab06b30Cfa9c6e7AE1B7598c7172",
"txData":
"0xf64e88c00fa204ed091aacd8a77c9fd3e764492b02f1fc0a46ff53b834bae25eac
ff6ebd",
            "txHash":
"0x0cbdf1a4b48c60aecc28903c8f6db7111291615a6ab83930df1bc000dacd3be2
",
            "createdAt": "2019-08-29T02:13:42.105929+09:00",
            "parameters": [
                {
                    "originalValue": {
                        "userID": 123,
                        "productOrdered": "Oranges"
                    }
                }
            ],
            "onChain": null,
            "isBulk": false
        },
        {
            "from": "0xF9450D254A66ab06b30Cfa9c6e7AE1B7598c7172",
            "txData":
"0xf64e88c0483293280cdbf2c26924313d570d179922e11236074a606d3c7fca05
7199206e",
            "txHash":
"0x0b657131851ff8aec13ad2f0aa0402d51ce747ff7ae67c0970daa6ad1c1b4560"
,
            "createdAt": "2019-08-29T02:06:37.011797+09:00",
            "parameters": [
                {
                    "originalValue": {
                        "userID": 123,
                        "productOrdered": "Apples"
                    }
                }
            ],
            "onChain": null,
            "isBulk": false
        }
    ]
  }
}
```

Note that the original values, as JSON objects, have been preserved in the cached method call, and that none of the three transactions have been recorded on blockchain 120 at the time of the request (as indicated by the "onChain":null value).

When a bulk transaction is created, it may be desirable to select a subset of cached transactions. For example, only transactions for a specific user, userID==123, will be selected and passed in as a pre-summarized JSON object. Internally, the integration platform can store these as Postgres JSONB values (a format that is more suitable for indexing and other operations). Interface server(s) 202 can support a simple query of the top-level values in any provided JSON object, as defined by the @>Postgres JSON query operator.

For example, the following request data structure can be used to query for userID==123 in the "_proof" parameter.

```
POST
.../chains/ethereum/addresses/witness/contracts/witness/methods/postProof/tran
sactions
{
  "query": {
    "_proof": {
      "userID": 123
    }
  }
}
```

An example of the response data structure is below.

```
{
  "status": 200,
  "message": "Success",
  "result": {
    "results": [
      {
        "from": "0xF9450D254A66ab06b30Cfa9c6e7AE1B7598c7172",
        "txData": "0xf64e88c00fa204ed091aacd8a77c9fd3e764492b02f1fc0a46ff53b834bae25eacff6ebd",
        "txHash": "0x0cbdf1a4b48c60aecc28903c8f6db7111291615a6ab83930df1bc000dacd3be2",
        "createdAt": "2019-08-29T02:13:42.105929+09:00",
        "parameters": [
          {
            "originalValue": {
              "userID": 123,
              "productOrdered": "Oranges"
            }
          }
        ],
        "onChain": null,
        "isBulk": false
      },
      {
        "from": "0xF9450D254A66ab06b30Cfa9c6e7AE1B7598c7172",
        "txData": "0xf64e88c0483293280cdbf2c26924313d570d179922e11236074a606d3c7fca057199206e",
        "txHash": "0x0b657131851ff8aec13ad2f0aa0402d51ce747ff7ae67c0970daa6ad1c1b4560",
        "createdAt": "2019-08-29T02:06:37.011797+09:00",
        "parameters": [
          {
            "originalValue": {
              "userID": 123,
              "productOrdered": "Apples"
            }
          }
        ],
        "onChain": null,
        "isBulk": false
      }
    ]
  }
}
```

As illustrated above, the response returns the two cached method calls for userID==123 and omits the one cached method call for userID==456. The algorithm for sub-selecting transactions can be executed by node module 254 and can be embedded in the algorithm for retrieving cached method calls. An example of such an algorithm can include the following steps:

Convert the parameter queries into SQL queries;
Find the parameter name in the enhanced ABI
Execute multiple inner joins, each matching a query
Eliminating calls without the satisfying values
Track the queried parameters
Retrieve the cached method calls from the database, joined with the cached parameter values A bulk transaction using the above sub-selection can be generated in response to the following request.

```
POST
.../chains/ethereum/addresses/witness/contracts/witness/methods/postProof/transactions
{
  "query": {
    "_proof": {
      "userID": 123
    }
  },
  "args": [
    null
  ],
  "createBulkTransaction": true,
  "from": "0xF9450D254A66ab06b30Cfa9c6e7AE1B7598c7172"
}
```

An example of the response is below.

```
{
  "status": 200,
  "message": "Success",
  "result": {
    "results": [
      {
        "from": "0xF9450D254A66ab06b30Cfa9c6e7AE1B7598c7172",
        "txData": "0xf64e88c00fa204ed091aacd8a77c9fd3e764492b02f1fc0a46ff53b834bae25eacff6ebd",
        "txHash": "0x0cbdf1a4b48c60aecc28903c8f6db7111291615a6ab83930df1bc000dacd3be2",
        "createdAt": "2019-08-29T02:13:42.105929+09:00",
        "parameters": [
          {
            "originalValue": {
              "userID": 123,
              "productOrdered": "Oranges"
            }
          }
        ],
        "onChain": null,
        "isBulk": false
      },
      {
        "from": "0xF9450D254A66ab06b30Cfa9c6e7AE1B7598c7172",
        "txData": "0xf64e88c0483293280cdbf2c26924313d570d179922e11236074a606d3c7fca057199206e",
        "txHash": "0x0b657131851ff8aec13ad2f0aa0402d51ce747ff7ae67c0970daa6ad1c1b4560",
        "createdAt": "2019-08-29T02:06:37.011797+09:00",
        "parameters": [
          {
            "originalValue": {
              "userID": 123,
              "productOrdered": "Apples"
            }
          }
        ],
        "onChain": null,
        "isBulk": false
      }
    ],
    "tx": {
      "from": "0xF9450D254A66ab06b30Cfa9c6e7AE1B7598c7172",
      "to": "0xfd8095F76B9ecD81F5F5571646Fa51ff127F8598",
      "value": "0",
      "gas": 45543,
      "gasPrice": "1",
      "data": "0xf64e88c0e80f917ee1067a3c0ff0409c96db0fdabfc8175a0ab25acc3997859f1472ab7f",
      "nonce": 10,
      "hash": "0x88b195becc946c88ab69d20dd72a9e6767b51549e39ce0665cbcdb0782f0efbf"
    },
    "submitted": false,
    "summarizedInputs": [
      "[{\"productOrdered\":\"Oranges\",\"userID\":123},{\"productOrdered\":\"Apples\",\"userID\":123}]"
    ]
  }
}
```

The request includes the query (userID==123) along with additional parameters to indicate that a bulk transaction is to be created. Since a transaction is being requested (calling a write method), other parameters include: 1) "args": the remaining arguments to the function, ordered, with the argument to be summarized set to null to explicitly indicate it is not being provided and thus the summarized value should be used; and 2) a "from": the address that will sign the transaction. The resulting response includes the summarized inputs as a JSON array, in a deterministic fashion (ordered, whitespace removed, and with maps sorted alphabetically by key recursively).

A new query of the cached method calls will indicate that the bulk transaction and its constituent transactions have been recorded on blockchain 120.

```
POST
.../chains/ethereium/addresses/witness/contracts/witness/methods/postProof/tran
sactions
{ }
```

The response is below.

```
{
  "status": 200,
  "message": "Success",
  "result": {
    "results": [
      {
        "from": "0xF9450D254A66ab06b30Cfa9c6e7AE1B7598c7172",
        "txData":
"0xf64e88c0e80f917ee1067a3c0ff0409c96db0fdabfc8175a0ab25acc3997859f14
72ab7f",
        "txHash":
"0x88b195becc946c88ab69d20dd72a9e6767b51549e39ce0665cbcdb0782f0efbf
",
        "createdAt": "2019-08-29T02:38:30.11012+09:00",
        "parameters": [
          {
            "originalValue": [
              {
                "userID": 123,
                "productOrdered": "Oranges"
              },
              {
                "userID": 123,
                "productOrdered": "Apples"
              }
            ]
          }
        ],
        "onChain": {
          "txHash":
"0xebea7409b1b1ee507011e371d8812a0f2e84bc12f360cacaae13cf79754525b1
",
          "blockHash":
"0x7ad03bcbb837fdcf8d351335a017cf42b42002717a8ea8eb5d468f5ccce05ede"
,
          "blockNumber": 21,
          "indexInBlock": 0,
          "triggeredAt": "2019-08-29T02:43:46+09:00",
          "isBulkTransaction": false
        },
        "isBulk": true
      },
      {
        "from": "0xF9450D254A66ab06b30Cfa9c6e7AE1B7598c7172",
        "txData":
"0xf64e88c0f31640128a1929c2d0ea453cb3ea3fbb15c0119112829b1135f47e21
a9a8c5d9",
        "txHash":
"0xf3c8f78fa8835b1abdf4479c96b0170ac23af8dada8e93795651250059c2a570"
,
        "createdAt": "2019-08-29T02:13:47.521503+09:00",
        "parameters": [
          {
            "originalValue": {
              "userID": 456,
              "productOrdered": "Apples"
            }
          }
        ],
        "onChain": null,
        "isBulk": false
      },
      {
        "from": "0xF9450D254A66ab06b30Cfa9c6e7AE1B7598c7172",
        "txData":
"0xf64e88c00fa204ed091aacd8a77c9fd3e764492b02f1fc0a46ff53b834bae25eac
ff6ebd",
        "txHash":
"0x0cbdf1a4b48c60aecc28903c8f6db7111291615a6ab83930df1bc000dacd3be2
",
        "createdAt": "2019-08-29T02:13:42.105929+09:00",
```

```
            "parameters": [
              {
                "originalValue": {
                  "userID": 123,
                  "productOrdered": "Oranges"
                }
              }
            ],
            "onChain": {
              "txHash":
"0xebea7409b1b1ee507011e371d8812a0f2e84bc12f360cacaae13cf79754525b1
",
              "blockHash":
"0x7ad03bcbb837fdcf8d351335a017cf42b42002717a8ea8eb5d468f5ccce05ede"
,
              "blockNumber": 21,
              "indexInBlock": 0,
              "triggeredAt": "2019-08-29T02:43:46+09:00",
              "isBulkTransaction": true
            },
            "isBulk": false
          },
          {
            "from": "0xF9450D254A66ab06b30Cfa9c6e7AE1B7598c7172",
            "txData":
"0xf64e88c0483293280cdbf2c26924313d570d179922e11236074a606d3c7fca05
7199206e",
            "txHash":
"0x0b657131851ff8aec13ad2f0aa0402d51ce747ff7ae67c0970daa6ad1c1b4560"
,
            "createdAt": "2019-08-29T02:06:37.011797+09:00",
            "parameters": [
              {
                "originalValue": {
                  "userID": 123,
                  "productOrdered": "Apples"
                }
              }
            ],
            "onChain": {
              "txHash":
"0xebea7409b1b1ee507011e371d8812a0f2e84bc12f360cacaae13cf79754525b1
",
              "blockHash":
"0x7ad03bcbb837fdcf8d351335a017cf42b42002717a8ea8eb5d468f5ccce05ede"
,
              "blockNumber": 21,
              "indexInBlock": 0,
              "triggeredAt": "2019-08-29T02:43:46+09:00",
              "isBulkTransaction": true
            },
            "isBulk": false
          }
        ]
      }
}
```

Note that the bulk transaction is marked with isBulk==true and the constituent transactions (method calls) are marked with isBulkTransaction==true. Also note that the previous transaction for userID==456, which is still cached and not yet on-chain, is in the data structure. Accordingly, a DApp in accordance with the implementations disclosed wherein is able to record a large number of individual transactions as being on-chain, while only having had to only sign and submit a single transaction to blockchain 120.

Parameter processing module 256 is configured to apply metadata describing the attributes of a smart contract, its methods, and input and output parameters of the methods for example, on a per-method per-input/output parameter basis, to adjust how parameter properties before the parameters are submitted to blockchain 120. Similarly, parameter processing module 256 can adjust the return value on its way back from blockchain 120. Each value is translated on input into a format acceptable to the smart contract method, and untranslated on output.

For example, a uint parameter set to data_format=datetime, would be passed as a date string such as 2006-01-02T15:04:05.999Z. Parameter processing module 256 could then convert this to an integer representing that date in seconds since the Unix epoch before passing this integer to the smart contract method. The reverse process would happen for a smart contract method output. As another example, a decimal point can be dynamically inserted into a smart contract method that returns an amount of type uint256. As exact decimal numbers, or numerics, are not supported by Solidity, the standard way of handling this situation is to use an integer and shift it by a constant or fixed number of decimal places. In the popular ERC20 token standard, a decimals( ) method provides the number of decimals place to shift the uint256 (unsigned integer) values for other methods input/output parameters that relate to token balances. For example, if decimals( ) returns 3, then the return value of the totalSupply( ) method should be shifted by 3 decimal places to the left. However, this method requires a great deal of processing resources, especially when accomplished for a large number of values.

Parameter processing module 256 can query the totalSupply( ) method for the "autotoken" instance (an alias for the address of a smart contract deployed on the Ethereum blockchain). An example of a response is below.

```
{
    "status": 200,
    "message": "Success",
    "result": {
        "output": "123000",
        "summarizedInputs": [ ]
    }
}
```

It can be seen that, in this example, the total supply is 123,000. If the smart contract decimal method is queried, the response below may be received, for example.

```
{
    "status": 200,
    "message": "Success",
    "result": {
        "output": 3,
        "summarizedInputs": [ ]
    }
}
```

Therefore, the result of totalSupply( ), along with all other balance/amount method input/output parameters should be shifted by 3 decimal places to the left. Note that the return value of totalSupply( ) was automatically enclosed in quotations because it is a uint256 value and could overflow JavaScript's 32-bit limit on integer sizes. The DApp would have to handle this as a JavaScript big number or string, as appropriate. The return value of the decimals( ) function, on the other hand, is of type uint8 (maximum decimal 256), and is automatically left without quotes, so that the application could use it directly as a JavaScript number. Parameter processing module 256 can, in this example, be configured to automatically shift the result of the totalSupply( ) function by 3 places. Further parameter processing module 256 can be configured to use the output of another function to specify the number of decimals. In this way, a varying number of decimals can be supported across smart contract instances, with a single configuration setup of parameter processing module 256. The decimals function of parameter processing module 256 can satisfy the following requirements: 1) it takes no parameters; 2) it returns a single integer value; and 3) it is constant (i.e., does not modify the blockchain state in any way).

As an example, a request can be made to parameter processing module 256 to use the output of decimals( ) method for the number of decimals of the totalSupply( ) method as shown below.

```
POST .../contracts/mltitoken/1.0/methods/totalSupply
{
    "outputs": [
        {
```

-continued

```
            "typeConversion": {
                "mode": "decimals",
                "decimalsFunction": "decimals"
            }
        }
    ]
}
```

If the totalSupply( ) method is called, the response will include a total supply value of 123.000 (the decimal place has been shifted three places to the left). An example algorithm for the conversion of smart contract input/output parameters is set forth below:

Load the enhanced ABI for the smart contract method

Convert the input parameters from their JSON types to their concrete types as expected by the smart contract method Perform any optional type conversions Call the smart contract method and get the results from the blockchain Perform any required adjustments on the returned types Perform any optional type conversions Return the outputs The "properties metadata" can exist in a separate data structure outside of the enhanced ABI to for ease of development. Properties metadata can be derived from three sources that are combined into the response:

The enhanced ABI (for information about data types and widths)

defaults set in code (for example, all typeConversion modes default to "auto")

The database (for an overlay of persisted property information: mode, decimalsAbsolute, decimalsFunction, and the like).

Property information may be persisted to the database as it is set. This "sparse" approach eliminates the need for re-processing all persisted contracts as the system is updated and reduces database storage requirements. Properties metadata serves two purposes:

Changing data is processed on its way to/from a smart contract (for example, interpreting decimals in a uint256 input parameter)

Providing the user interface with additional information about the contracts, methods and parameters that it can use to change its behavior (for example, the "timestamp" type conversion mode is a passthrough number but it could be used by an upstream UI to display a date/time picker).

The following REST API methods can be stored in a database. Retrieving or setting the method or parameter properties can be done on the smart contract, but the effects themselves (for example, inserting a decimal point into a return value) is observed at the call to a smart contract method at a particular address. The setters methods are all implemented as PUT HTTP methods. Since the contracts, methods, and parameter properties are already implicitly there, with their default values. It is not a requirement to set them before retrieving them.

Get Parameter Property

GET /api/v0/contracts/{label}/methods/{method}/{param_type}/{param_index}
Sample URL:
http://localhost:8080/api/v0/contracts/mltitoken/methods/mint/input/0
Retrieve the parameter property for a single parameter of a smart contract method.
{label} = smart contract label
{method} = smart contract method
{param_type} = input or output
{param_index} = 0-based index of the input or output parameter
Returns: types.ParamProperty
type ParamProperty struct {
   DataType string 'json:"dataType"'
   DataTypeWidth int 'json:"dataTypeWidth"'
   Mode string 'json:"mode"'
   DecimalsAbsolute null.Int 'json:"decimalsAbsolute"'
   DecimalsFunction null.String 'json:"decimalsFunction"'
}
Where:
DataType = Solidity type: uint, int, bytes, address, etc.
DataTypeWidth = # of bits for uint/int, # of bytes for bytes, string, etc.
Mode = one of auto, hex, etc. - see below for more info
DecimalsAbsolute = absolute number of decimals, void only for int/uint
DecimalsFunction = method to retrieve decimals from, valid only for int/uint Set Parameter Property PUT /api/v0/contracts/{label}/methods/{method}/{param_type}/{param_index}
Sample PUT request:
http://localhost:8080/api/v0/contracts/mltitoken/methods/mint/input/0
   Body:
      {
        "mode": "decimals",
        "decimalsAbsolute": 3
      }
Set the parameter property for a single parameter of a smart contract method.
Takes: types.ParamProperty but only considers the following subset of fields
type ParamProperty struct {
   Mode string 'json:"mode"'
   DecimalsAbs null.Int 'json:"decimalsAbsolute"'
   DecimalsFunction null.String 'json:"decimalsFunction"'
}
Returns: types.ParamProperty
Get Method Properties
GET /api/v0/contracts/{label}/methods/{method}
Sample URL: http://localhost:8080/api/v0/contracts/mltitoken/methods/mint
Retrieve the method and parameter properties for a smart contract method.
{label} = smart contract label
{method} = smart contract method (eventually might add module support)
Returns: types.MethodProperties
type MethodProperties struct {
   Inputs ParamProperties 'json:"inputs"'
   Outputs ParamProperties 'json:"outputs"'
   ReadAddress *Address 'json:"read_address"'
   ReadMethod null.String 'json:"read_method"'
   WriteAddress *Address 'json:"write_address"'
   WriteMethod null.String 'json:"write_method"'
}
type ParamProperties [ ]ParamProperty
Where:
Inputs = slice of input parameter properties in same order as ABI
Outputs = slice of output parameter properties in same order as ABI
ReadAddress = absolute address that is allowed to call read on this method
ReadMethod = method to retrieve read address from
WriteAddress = absolute address that is allowed to call write on this method
WriteMethod = method to retrieve write address from Set Method Properties PUT /api/v0/contracts/{label}/methods/{module_and_method}
Sample PUT request:
http://localhost:8080/api/v0/contracts/mltitoken/methods/balanceOf
Body:

```
{
  "inputs": [
    { "data_format": "auto" }
  ],
  "outputs": [
    { "data_format": "decimal", "decimals_absolute": 3 }
  ]
}
```
Set the method and parameter properties for a smart contract method.
Takes: types.MethodProperties but only considers the following subset of fields for each types.ParamProperty:
type ParamProperty struct {
  Mode string 'json:"mode"'
  DecimalsAbsolute null.Int 'json:"decimalsAbsolute"'
  DecimalsFunction null.String 'json:"decimalsFunction"'
}
Returns: types.MethodProperties
Get all Method Properties
GET /api/v0/contracts/{label}/methods
Sample URL: http://localhost:8080/api/v0/contracts/mltitoken/methods
Retrieve the method and parameter properties for all methods of a smart contract
{label} = smart contract label
Returns: [ ]types.MethodProperties†

Not all combinations of properties are valid for all parameter types. Some properties are mutually exclusive with others. Checks are implemented to ensure data integrity. The following tables outline the valid property combinations and data formats of some implementations.

Properties;

| Data Type | Valid Data Type Widths | Valid Modes | Mode = auto Means |
|---|---|---|---|
| uint, int | 8 . . . 256 in multiples of 8 | auto, number, date, time, datetime, duration, timestamp, decimal | number |
| bytes | 0 . . . 32, where 0 means a slice of bytes | auto, hex, array, string | hex |
| bool, address, string, function, array, mapping | 0 | auto | auto |

Modes:

| Mode | Applicable To Data Type | Means | Sample |
|---|---|---|---|
| auto | (all) | Pass-through the value from go-ethereum | (data type dependent) |
| number | uint, int | Unsigned or signed integer | 123456 |
| date | uint, int | Date as a string in ISO 8601 format as seconds since the Unix epoch | 2006 Jan. 2 |
| time | uint, int | Time as a string in ISO 8601 format as seconds since midnight - essentially, a duration | 15:04:05 |
| datetime | uint, int | Date and time as a string in RFC 3339 format as | 2006-01-02T15:04:05.999Z |
| duration | uint, int | implemented by JS' date.toISOString ( ) method Duration of time as accepted by Go's time.ParseDuration( ) function | 12 h |
| timestamp | uint, int | Seconds since the Unix epoch, with no translation done | 1549125748 |
| decimal | uint, int | A numeric (i.e., exact math) number with a decimal point and defined precision | 123.456 |
| hex | bytes | Hex string prefixed or not with 0x | 0xa1b2c3 |
| array | bytes | Array of bytes | [12, 34, 256] |
| string | bytes, string | String | Hello world! |
| json | bytes, string | JSON object | {"abc": "def", "ggg": 123} |

The default mode for all types can be "auto". It can be set explicitly and stored in the database, or will be set automatically by the system. For most data types this means, "pass through the value returned from go-ethereum". For uint and int, it means "number", and for bytes it means "hex". For uint and int types, decimals may be set absolutely through decimalsAbsolute, or indirectly via a named smart contract method in decimalsFunction.

In some implementations, the number of digits to the right of the decimal place must be less than or equal to the number of decimals and no attempt is made to interpret significant digits, both for simplicity and to help catch issues where most of the time digits to the right of the decimal point are 0.

For example:
decimals=3, strAmount=10.003, OK
decimals=3, strAmount=10.03, OK
decimals=3, strAmount=10, OK
decimals=3, strAmount=10.0003, ERROR
decimals=3, strAmount=10.0030, ERROR—we don't try to detect mathematically significant decimals If decimalsAbsolute is set, all addresses associated with the smart contract will use this absolute number of decimals. The method must take no parameters and return a single uint or int value. If decimalsFunction is set, each time it is set each associated address will have this method queried and the results will be cached for each associated contract. As new addresses are associated with a contract, they too will have their decimals method queried.

Method properties consist of the input and output parameter properties, as slices of parameter properties, in the order they are defined in the enhanced ABI. Method properties also consist of read and write addresses or method names, which dictate which address can call a read or write on this method. There can be a "store" attribute which indicates that the system should cache any calls to the address in its database for later use.

In some of the previous examples, a simple unsigned transaction has been returned to the user. In reality, prior to being returned to the user, MultiBaas passes the unsigned transaction to optional transaction response hooks, which may perform additional processing. An example of an algorithm for transaction response hooks is as follows.

Decode the function call parameters and create an unsigned transaction

Retrieve the array of transaction response hooks, which are functions, from electronic storage 228

Loop through each transaction response hook (function), calling it in turn with the unsigned transaction Each transaction response hook will return its own unsigned transaction, which could be the unsigned transaction that was passed into it verbatim, or could be a "wrapped" unsigned transaction Use this returned unsigned transaction as the input for the next transaction response hook Each transaction response hook could choose to take additional actions, such as caching the unsigned transaction, signing and submitting it to the blockchain, etc.

Once all of the transaction response hooks have been processed, return the final unsigned transaction The implementations can leverage Hardware Security Modules (HSMs). HSMs are physical, hardened devices that generate and manage cryptographic keys. Two key features are that the keys are generated on-device and cannot be extracted from the device, and that they have an API to interact with them. One of transaction response hooks can provide an interface to HSMs and allow properly permissioned users to have multi-sig governance module 258 sign transactions using the HSM.

The signing process is triggered by:

Including "signAndSubmit: true" in the transaction request

Sending the transaction request with the "from" address as that of an HSM address that MultiBaas has been configured with Having permissions to sign the transaction via role-based access control (RBAC) system Setting up the HSM is performed through separate REST API calls, of a create-read-update-delete (CRUD) nature.

The following sample transaction calls the mint( ) smart contract function and requests MultiBaas to sign it with an HSM address.

```
Request
POST .../chains/ethereum/addresses/autotoken/contracts/mltitoken/methods/mint
{
  "args": [
    "123"
  ],
  "from": "0xF9450D254A66ab06b30Cfa9c6e7AE1B7598c7172",
  "signer": "0xF9450D254A66ab06b30Cfa9c6e7AE1B7598c7172",
  "signAndSubmit": true
}
Response
{
  "status": 200,
  "message": "Success",
  "result": {
    "tx": {
      "from": "0xF9450D254A66ab06b30Cfa9c6e7AE1B7598c7172",
      "to": "0x9deE62D32898B37F2BDf7e7cB1FA16a45D31D67a",
      "value": "0",
      "gas": 37237,
      "gasPrice": "1",
      "data": "0xa0712d680000000000000000000000000000000000000000000000000000000000001e078",
      "nonce": 5,
      "hash": "0x9c85fc363ec631f1b62ea8254e5634b3e120c57f3de6616bed4491b7ed319c7e"
    },
    "submitted": true,
    "summarizedInputs": [
      null
    ]
  }
}
```

Note in the response that "submitted: true" indicates that server(s) 202 has signed and submitted the transaction to the blockchain. The unsigned transaction is also returned as a convenience.

"Multisignature (multisig) wallets" are smart contracts that allow multiple signers to review and agree on an action on the blockchain before the action is executed. For example, a multisig wallet could be used to control a token, such as ETH, or a smart contract, requiring signatures from at least M of N total signers to execute the action. More generally, multisg wallets implement a kind of decentralized governance. On-chain multisig wallets are made possible by the fact that smart contracts can call other smart contracts. To execute a multisig transaction, one would:

Compose an unsigned transaction.
Wrap the unsigned transaction in a multisig transaction, producing a new unsigned transaction.
Sign and broadcast the wrapped transaction to the blockchain.
Notify the other N signers to review the transaction.
M of N signers compose an approval transaction.
The signers sign and submit their approval transactions to the blockchain.
When the last required signer submits their approval transaction, the resulting original transaction is executed.

The wrapping and signing steps are extremely complex and not widely supported. The disclosed implementations make this far simpler and less resource intensive by automatically recognizing when a transaction is a multisig transaction and seamlessly "wrapping" the unsigned transaction in the appropriate multisig transaction API call (submitTransaction( ), approveTransaction( ), etc.).

The following example request, a call to mint( ), illustrates the concept of wrapped transactions.

multisig wallet, whereas the signer field is the address of the submitter. In the response, the "data" field includes the wrapped transaction. The key parts of the "data" field can be dissected as follows:

0xc6427474 . . . : the wrapping outer function selector, which is the first four bytes of the Keccak256 hash of the multisig Solidity method signature. This is padded to 64 bytes, hence the trailing zeroes. Explicitly:
0xc6427474=keccak256("submitTransaction(address, uint256,bytes)")[0:4]
This is followed by the three parameters to submitTransaction( )
address destination (of the target smart contract): 0xcb1d236be8bcc58bafc35be1c300ef4b8614cb7a
uint256 value (of ETH to send): 0x0 . . . 0
bytes data (the wrapped inner function call and its parameters): see next bullet point
0xa0712d68 . . . : the wrapped inner function selector, which is the first four bytes of the Keccak256 hash of the Solidity method signature. Explicitly:
0xa0712d68=keccak256("mint(uint256)")[0:4]

This is followed by the parameters to mint( ). The go-ethereum transaction ABI encoder library used within MultiBaas may add additional parameters as required. The Ethereum blockchain has a concept called "events", also referred to as "transaction logs", which are used to indicate that a specific action has taken place within a smart contract. The Ethereum blockchain is eventually consistent, and

```
Request
POST
.../chains/ethereum/addresses/multisigtoken/contracts/mltitoken/methods/mint
{
  "args": [
    "123"
  ],
  "from": "0xc6cc1faAEcf365F8A5Bca1A19fa893F89C88823F",
  "signer": "0xF9450D254A66ab06b30Cfa9c6e7AE1B7598c7172",
  "signAndSubmit": true
}
Response
{
  "status": 200,
  "message": "Success",
  "result": {
    "tx": {
      "from": 0xF9450D25A66ab06b30Cfa9c6e7AE1B7598c7172",
      "to": "0xc6cc1faAEcf365F8A5Bca1A19fa893F89C88823F",
      "value": "0",
      "gas": 151453,
      "gasPrice": "1",
      "data":
"0xc6427474000000000000000000000000cb1d236be8bcc58bafc35be1c300ef4
b8614cb7a00000000000000000000000000000000000000000000000000000000
00000000000000000000000000000000000000000000000000000000000000000
00000006000000000000000000000000000000000000000000000000000000000
000000024a0712d68000000000000000000000000000000000000000000000000
0000000000001e078000000000000000000000000000000000000000000000000
000000000",
      "nonce": 6,
      "hash":
"0x4f2e9c59ceb467a9f68334136d6ad6554e20d97fabf6a05c4d70811bb2a73f87"
    },
    "submitted": true,
    "summarizedInputs": [
      null
    ]
  }
}
```

Note that in the request, the "from" and "signer" fields are different. The "from" field relates to the unsigned transaction that is to eventually be executed and is the address of the transactions sent to the blockchain are only considered to have been processed once they have been included into a block.

Without transactions, an application built on top of Ethereum would have to check the updated state of the blockchain vs. the previous state, on every new block. This is untenable if there are more than a few values to watch. For example, if there are 100,000 user accounts, on each new block an application would have to query its smart contract on the order of 100,000 times to see if anything has changed. With events, the application can simply subscribe to any events that a particular address is issuing and take action on those specific events. For example, updating data in a user interface on a mobile device.

However, even when using events a DApp still needs to maintain its own state. Additionally, there are unusual cases to handle. For example, events can be undone if a transaction that emitted an event is part of a block that is no longer considered part of the blockchain due to a chain reorganization (the situation where a client discovers a new difficulty-wise-longest well-formed blockchain which excludes one or more blocks that the client previously thought were part of the difficulty-wise-longest well-formed blockchain). Also, if the DApp loses its connection to its Ethereum node, it may miss interim events and need to perform a delta between the events it knows about and the events missed during the connection interruption to the node. Implementations disclosed herein address these situations by handling event caching and caching on behalf of DApps, exposing events via a REST API.

Event monitoring persistence can be enabled on a per-smart contract per-address basis when a smart contract is linked (i.e., associated with) an address. This causes the system to start up an asynchronous event monitor that subscribes to events on that address via its blockchain node, pre-processes them, and persists them to the database for later retrieval. Transactions (and in turn their events) removed from the blockchain due to chain reorganizations and other anomalies are similarly removed from the database.

If the Ethereum node connection is interrupted, due to network interruption or a problem with the node, the system will automatically reconnect. Within a group of instances that are acting in concert to support the same DApp, only one of them need monitor and persist events to the database at any given time. At startup, the system goes through an event synchronization protocol for each smart contract instance using, for example, the following algorithm:

Compare the block hash of the most recent event in the database to what is on the blockchain.

If the block hash is not present on the blockchain, remove the event from the database and return to the compare above.

If the block hash is present on the blockchain, proceed to the next step.

Process events from blocks numbered from the most recent event in the database to the current block on the blockchain. For example, if the most recent event in the database occurred in block 7, and the latest block on the blockchain is block 10, process past events from block 7 through 10 only.

Subscribe to future events from the current block forward.

Figure 6:
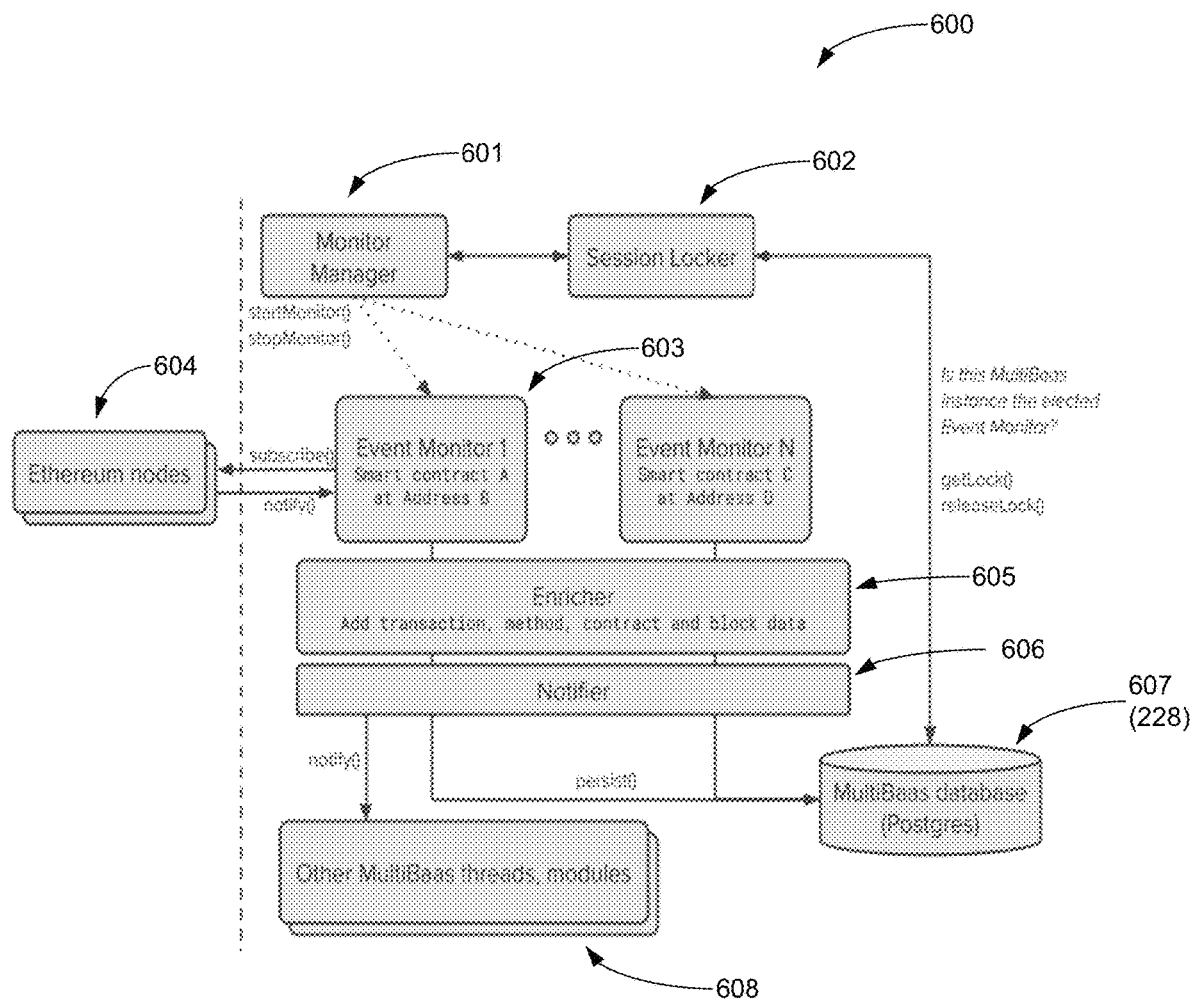
FIG. 6 is a block diagram of event monitoring, persistence, and notification system in accordance with an implementation.

FIG. 6 is a block diagram of event monitoring, persistence, and notification system in accordance with an implementation. The overall event monitoring system 600 is a subsystem of the interface server(s) 202 and can be implemented as one or more modules, in a manner similar to modules 242-258 of FIG. 1, for example. The event monitoring system is responsible for persisting event data to the database 607 (stored in electronic storage 228, as an example). The monitor manager 601 in each interface server 202 waits to acquire a singular lock from the database 607. This lock ensures that only a single interface server of all of the interface server(s) 202 is writing events to the database 607 at any given time, to ensure that an event is cached in the database 607 exactly once. Once the lock is acquired by the monitor manager 601, it starts up one event monitor 603 for each combination of smart contract and address. Each event monitor 603 subscribes to events from blockchain 120 (Ethereum events in this example) by making a request to an Ethereum node 604. The event monitor 603 initially processes all past events, before processing ongoing events, in order that they were confirmed in each Ethereum block. These Ethereum events form a time series view of the state of a smart contract at a given address, and a typical Ethereum node 604 is able to send events at a rate of a few per second, far slower than is useful for typical users of the interface server(s) 202. In this way, the interface server(s) 202 via the event monitoring system 600, store (cache) the events in the database 607 for later retrieval and processing, either by the users of the interface server(s) 202 directly, or by the interface server(s) 202 themselves. Each event is processed by an event monitor 603, and sent to an enricher 605 which adds transaction, method, contract and block data. This extra data may require additional database 607 or Ethereum node 604 lookups and is useful to users of the interface server(s) 202 when later processing the events. The enricher 605 then sends the event to the notifier 606, which both persists the event to the database 607 (or, in the case of a blockchain re-organization, deletes it from the database 607), and sends it internally to other threads and other modules 608. The interfaces between each of the components in the event monitoring system 600 are decoupled by asynchronous channels, and it is designed to gracefully survive disconnects and outages of both database 607 and Ethereum node 604.

The system exposes events via a REST API endpoint on each smart contract instance. The REST API can be created in the manner described above. The following is an example REST API request and corresponding response.

```
Request:
GET .../chains/ethereum/addresses/autotoken/events
{ }
Response:
  {
    "status": 200,
    "message": "Success",
    "result": [
      {
        "triggeredAt": "2019-09-30T02:38:16+09:00",
        "event": {
          "name": "Mint",
          "signature": "Mint(address,address,uint256)",
```

```
            "inputs": [
              {
                "name": "minter",
                "value":
"0xF9450D254A66ab06b30Cfa9c6e7AE1B7598c7172",
                "hashed": false
              },
              {
                "name": "receiver",
                "value":
"0xF9450D254A66ab06b30Cfa9c6e7AE1B7598c7172",
                "hashed": false
              },
              {
                "name": "value",
                "value": "123000",
                "hashed": false
              }
            ],
            "rawFields":
"{\"address\":\"0x9dee62d32898b37f2bdf7e7cb1fa16a45d31d67a\",\"topics\":[\"0x
ab8530f87dc9b59234c4623bf917212bb2536d647574c8e7e5da92c2ede0c9f8\",\
"0x000000000000000000000000f9450d254a66ab06b30cfa9c6e7ae1b7598c717
2\",\"0x000000000000000000000000f9450d254a66ab06b30cfa9c6e7ae1b7598c
7172\"],\"data\":\"0x00000000000000000000000000000000000000000000000
0000000000001e078\",\"blockNumber\":\"0x10\",\"transactionHash\":\"0x9c85fc363
ec631f1b62ea8254e5634b3e120c57f3de6616bed4491b7ed319c7e\",\"transactio
nIndex\":\"0x0\",\"blockHash\":\"0x0eaecc9243c3cfa8ae13aa4a8f0ca23fd81224f3
a7ed1fccca05ca1391b91b09\",\"logIndex\":\"0x0\",\"removed\":false}",
            "contract": {
              "address":
"0x9deE62D32898B37F2BDf7e7cB1FA16a45D31D67a",
              "name": "MltiToken",
              "label": "autotoken"
            },
            "indexInLog": 0
          },
          "transaction": {
            "from": "0xF9450D254A66ab06b30Cfa9c6e7AE1B7598c7172",
            "txData":
"0xa0712d68000000000000000000000000000000000000000000000000000000
000001e078",
            "txHash":
"0x9c85fc363ec631f1b62ea8254e5634b3e120c57f3de6616bed4491b7ed319c7e
",
            "txIndexInBlock": 0,
            "blockHash":
"0x0eaecc9243c3cfa8ae13aa4a8f0ca23fd81224f3a7ed1ccca05ca1391b91b09",
            "blockNumber": 16,
            "contract": {
              "address":
"0x9deE62D32898B37F2BDf7e7cB1FA16a45D31D67a",
              "name": "MltiToken",
              "label": "autotoken"
            },
            "method": {
              "name": "mint",
              "signature": "mint(uint256)",
              "inputs": [
                {
                  "name": "_amount",
                  "value": "123.000",
                  "hashed": false
                }
              ],
              "isConstructor": false,
              "isFallback": false
            }
          }
        },
        ...
      ]
}
```

In the abbreviated response above, there is a single event, Mint( ). The standard event from web3 only includes the "rawFields" field. implementations can enrich the event with the following metadata:

triggeredAt: the wall clock time the block that the event was included in was mined.
event: a structure about the event itself
name and signature indexInLog: the event's index within its parent transaction log Inputs: the parameters supplied to the event, decoded and converted according to type conversions.

transaction: a structure about the transaction that generated the event from: the address that initiated the transaction txData, txHash, txIndexInBlock: key transaction fields blockHash, blockNumber: key block information contract: information about the contract the transaction is sent to, which could be different from the contract that generated the event. Some of this could be incomplete.

method: information about the original method called that resulted in the event being generated. Some of this could be incomplete.

Events are time-series data. If a DApp processes all of the events for a given smart contract instance in order, keeping track of state and updating it with each event, it will have an accurate view of the current state of the smart contract. For smart contract instances with hundreds of thousands or millions of events, processing through these events could take minutes. It is not efficient to do so on every API request, so implementations leverage Event Queries as a way to perform this state aggregation on interface server(s) 202 and return the aggregated result.

However, the logic for how state should be updated with each event is unique to the smart contract. Therefore, the system must be configured to understand how each event should affect its own reckoning of the state. For example, consider the following state of an ERC20 token smart contract:

| owner (Ethereum address) | balanceOf(owner) |
|---|---|
| 0xA | 100 |
| 0xB | 0 |
| 0xC | 0 |

Assume that the following Transfer(address indexed_from, address indexed_to, uint256_value) events are then emitted by the contract:

Transfer(0xA, 0xB, 50)
Transfer(0xA, 0xC, 20)
Transfer(0xB, 0xC, 10)
Transfer(0xB, 0xA, 10)

At this point, the state of the contract, if we were to call balanceOf(owner) for each of owner=0xA, 0xB and 0xC, would be:

| owner (Ethereum address) | balanceOf(owner) |
|---|---|
| 0xA | 40 |
| 0xB | 30 |
| 0xC | 30 |

However, what we might actually want to compute is the total amount transferred out of any single address, in which case the table might look like:

| owner (Ethereum address) | Total Transferred Out of owner |
|---|---|
| 0xA | 70 |
| 0xB | 20 |
| 0xC | 0 |

The event queries disclosed herein provide the ability to compute both kinds of aggregations of the event time series data. The system provides a flexible system for specifying event queries, and then running event data through them to produce an aggregated result.

Figure 7A:
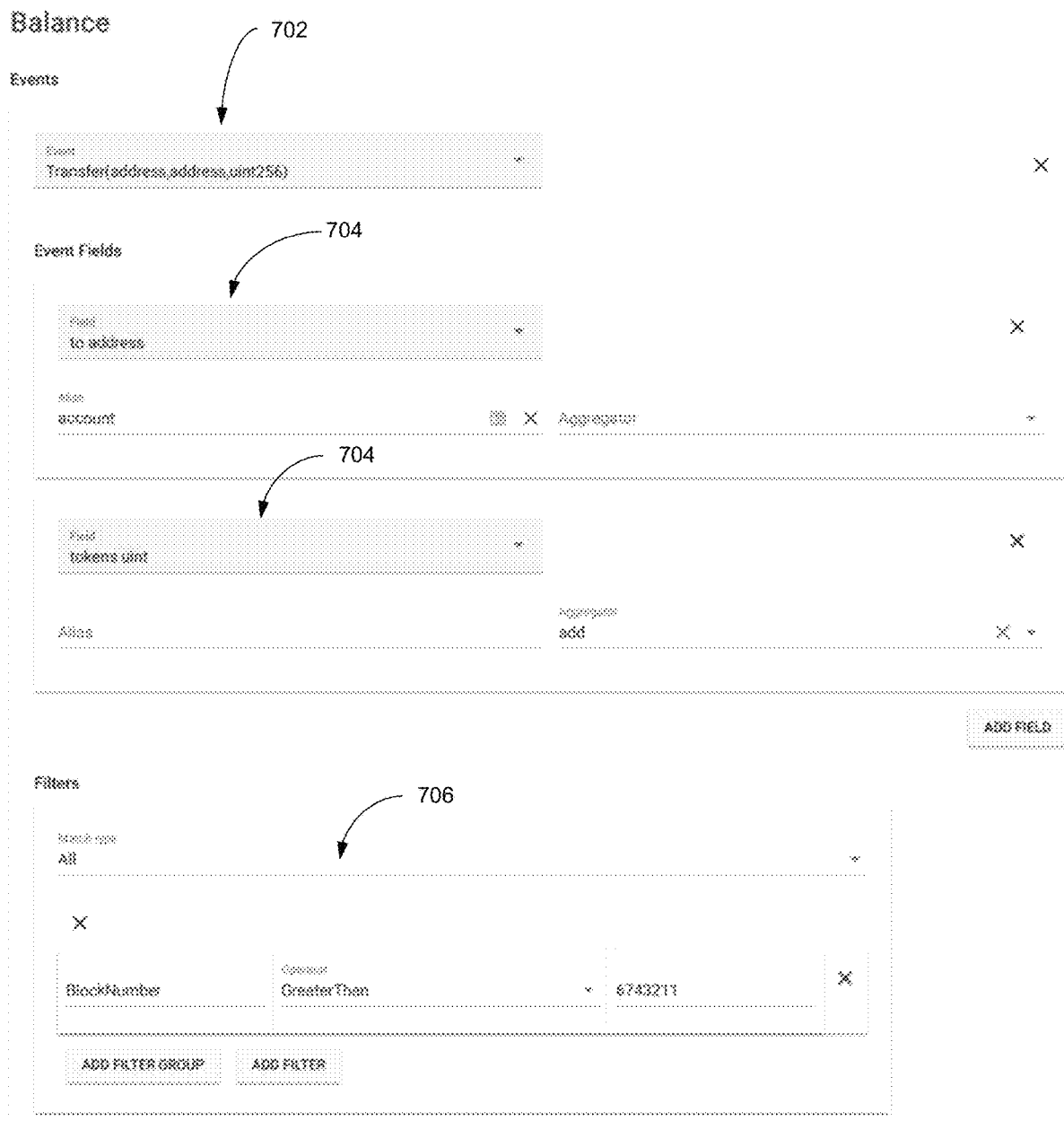
Figure 7B:
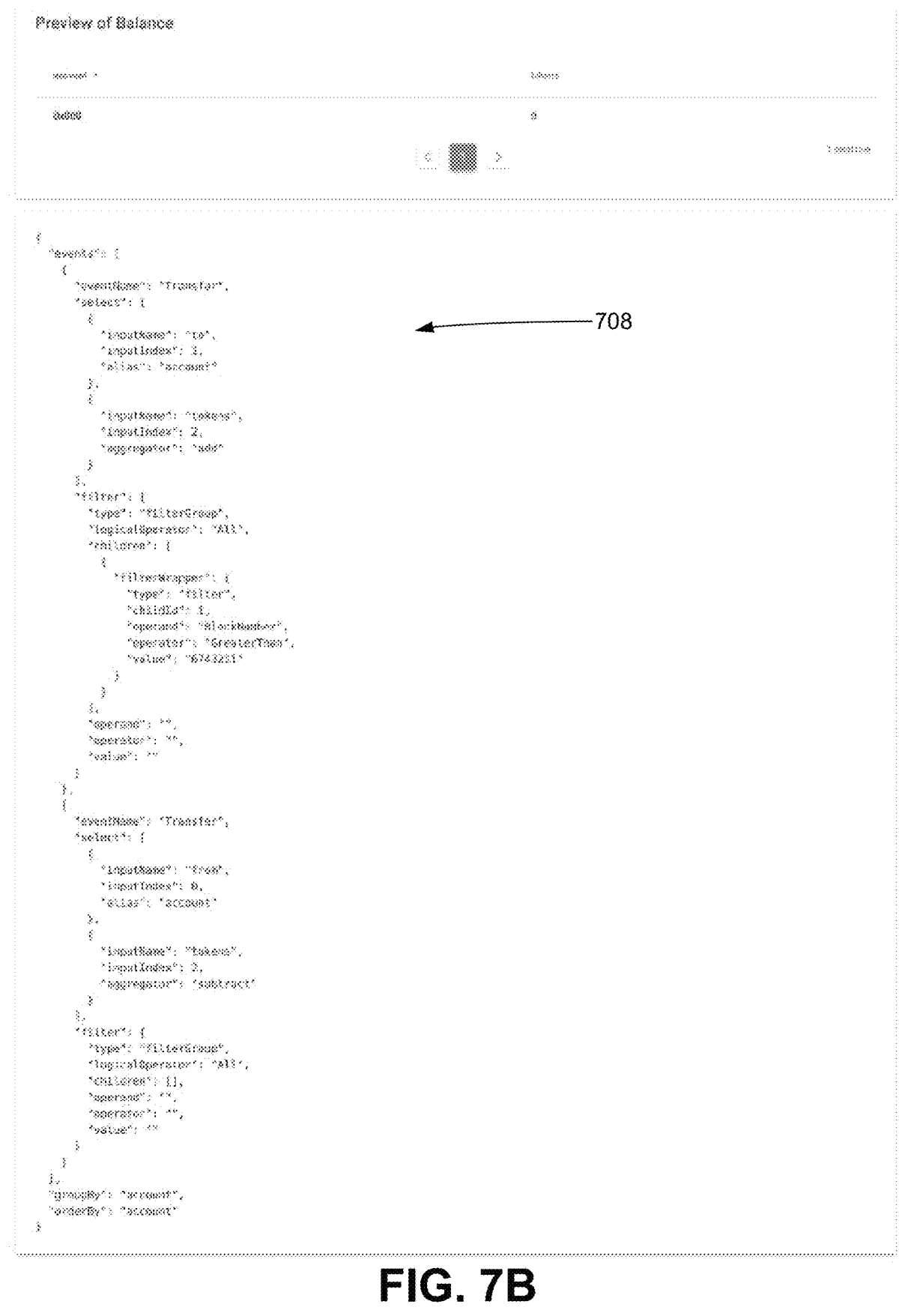

FIGS. 7A-7B illustrate an example of a web-based UI, executed by Web UI module 252 of FIG. 2, for managing and interacting with event queries. The main screen of the event queries management UI (FIG. 7A) displays an event to be queried (entered by a user) at 702, and fields of the event at 704. For each defined event, one or more fields may be added. For each event query, a field may be selected to group by and order by. Filters can be applied, by the user, to the query at 706. Multiple events and corresponding filters can be specified by the user through the UI and aggregated to the event query. In the example of FIG. 7A, the filter is that the block number is greater than 6743211.

The UI screen of FIG. 7B shows a preview of the event query at 714, along with the raw JSON that is, or will be, persisted the database. The event query JSON links event inputs, optionally with an alias, to an aggregator, along with a group by and order by clause. The JSON presented in FIG. 7B is for the Balance event query that focuses on the Transfer( ) event. The system then takes this event query JSON and uses it to build a SQL statement that will select and aggregate the time series event data into the desired aggregated result. The following is an example of an algorithm that can be used for this function.

For each event specified in the event query, generate a list of deduplicated database columns based on the fields specified across all of the events in the event query. The field is one of the inputs to the event itself. For example, for the event Transfer(address from, address to, tokens uint256), a field would be one of "from", "to", or "tokens". If two events in the event query listed the "tokens" field of the Transfer( ) event, the deduplicated list of columns would include only a single reference to the "tokens" field. Generation of the SQL statement begins by adding a clause to the top-level SELECT statement to return each column, either as a bare column or as an aggregation.

SQL for each of the events in the event query is added in turn to select the required column(s) for that event from the events database. An optional filter is added, based on a particular value or range of values of the column(s. Each of these individual event SQL components is merged via a UNION into the top-level SQL statement.

Final sorting and aggregation clauses are added to the SQL before it is returned.

Server(s) 202 may include communication lines, or ports to enable the exchange of information with a network and/or other computing platforms. Illustration of server(s) 202 in FIG. 2 is not intended to be limiting. Server(s) 202 may include a plurality of hardware, software, and/or firmware components operating together to provide the functionality attributed herein to server(s) 202. For example, server(s) 202 may be implemented by a cloud of computing platforms operating together as server(s) 102.

Electronic storage 228 may comprise non-transitory storage media that electronically stores information. The electronic storage media of electronic storage 128 may include one or both of system storage that is provided integrally (i.e., substantially non-removable) with server(s) 202 and/or removable storage that is removably connectable to server(s) 202 via, for example, a port (e.g., a USB port, a firewire port, etc.) or a drive (e.g., a disk drive, etc.). Electronic storage 228 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 228 may include one or more virtual storage resources (e.g., cloud storage, a virtual private network, and/or other virtual storage resources). Electronic storage 228 may store software algorithms, information determined by processor(s) 220, information received from server(s) 202 and other devices to function as described herein.

Processor(s) 220 may be configured to provide information processing capabilities in server(s) 202. As such, processor(s) 220 may include one or more of a digital processor, an analog processor, a digital circuit designed to process information, an analog circuit designed to process information, a state machine, and/or other mechanisms for electronically processing information. Although processor(s) 220 is shown in FIG. 2 as a single entity, this is for illustrative purposes only. In some implementations, processor(s) 220 may include a plurality of processing units. These processing units may be physically located within the same device or may represent processing functionality of a plurality of distributed devices operating in coordination. Processor(s) 220 may be configured to execute the disclosed functions by software; hardware; firmware; some combination of software, hardware, and/or firmware; and/or other mechanisms for configuring processing capabilities. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules are illustrated in FIG. 1 as being implemented within a single processing unit, one or more of the modules may be implemented remotely from the other modules. The description of the functionality provided by the different modules is for illustrative purposes, and is not intended to be limiting, as any of the modules may provide more or less functionality than is described.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of creating an interface between a smart contract to be executed on a decentralized architecture and a user component, the method comprising:
   receiving code corresponding to the smart contract at an interface server, wherein the code corresponding to the smart contract is at least one of byte code and source code;
   the interface server parsing an application binary interface (ABI) corresponding to the smart contract;
   the interface server constructing an enhanced application binary interface (EABI) based on the ABI, the EABI having at least one of a different data structure and additional metadata as compared to the ABI; and
   the interface server creating a REST Application Programming Interface (API) specific to the smart contract based on the EABI.

2. The method of claim 1, wherein the code corresponding to the smart contract is the source code, the method further comprising the interface server compiling the source code into executable code and the ABI.

3. The method of claim 1, wherein the REST API includes one or more of a method for retrieving parameter properties, a method for setting parameter properties, a method for retrieving function properties, and/or a method for setting function properties.

4. The method of claim 1, wherein the enhanced ABI is constructed based on a solc ABI, solc developer documentation, solc user documentation and wherein the additional metadata is stored in a database of the interface server.

5. The method of claim 1, wherein the enhanced ABI is a data structure object with four top-level types, each representing one of constructor constructs, fallback constructs, function constructs or event constructs, wherein each type of construct has a different purpose and different metadata parameters which describe the construct.

6. The method of claim 4, wherein the additional metadata includes a field for enabling caching of method calls.

7. The method of claim 4, wherein the additional metadata includes a field for enabling summarization of multiple signature requests into a single transaction.

8. The method of claim 1, further comprising the interface server applying metadata describing attributes of the smart contract, methods of the smart contract, and input and output parameters of the methods to adjust parameter properties before the parameters are submitted to a blockchain, and adjust a return value from the blockchain.

9. The method of claim 1, wherein the REST API permits a multisig transaction by wrapping an unsigned transaction in the multisig transaction.

10. The method of claim 1, wherein the REST API permits a smart contract events to be queried and retrieved based on parameters in the query.

11. A system for creating an interface between a smart contract to be executed on a decentralized architecture and a user component, the system comprising:
    an interface server including at least one computer processor and at least one memory operatively coupled to the at least one computer processor and storing instructions which, when executed by the at least one computer processor, cause the at least one computer processor to:
    receive code corresponding to the smart contract, wherein the code corresponding to the smart contract is at least one of byte code and source code;
    parse an application binary interface (ABI) corresponding to the smart contract;
    construct an enhanced application binary interface (EABI) based on the ABI, the EABI having at least one of a different data structure and additional metadata as compared to the ABI; and
    create a REST Application Programming Interface (API) specific to the smart contract based on the EABI.

12. The system of claim 11, wherein the code corresponding to the smart contract is the source code, the instructions further causing the at least one processor to compile the source code into executable code and the ABI.

13. The system of claim 11, wherein the REST API includes one or more of a method for retrieving parameter properties, a method for setting parameter properties, a method for retrieving function properties, and/or a method for setting function properties.

14. The system of claim 11, wherein the enhanced ABI is constructed based on a solc ABI, solc developer documentation, solc user documentation and wherein the additional metadata is stored in a database of the interface server.

15. The system of claim 11, wherein the enhanced ABI is a data structure object with four top-level types, each representing one of constructor constructs, fallback constructs, function constructs or event constructs, wherein each type of construct has a different purpose and different metadata parameters which describe the construct.

16. The system of claim 14, wherein the additional metadata includes a field for enabling caching of method calls.

17. The system of claim 14, wherein the additional metadata includes a field for enabling summarization of multiple signature requests into a single transaction.

18. The system of claim 11, the instructions further causing the at least one processor to apply metadata describing attributes of the smart contract, methods of the smart contract, and input and output parameters of the methods to adjust parameter properties before the parameters are submitted to a blockchain, and adjust a return value from the blockchain.

19. The system of claim 11, wherein the REST API permits a multisig transaction by wrapping an unsigned transaction in the multisig transaction.

20. The system of claim 11, wherein the REST API permits a smart contract events to be queried and retrieved based on parameters in the query.

21. Non-transitory computer readable media having instructions stored thereon which, when executed by one or more computer processors, cause the one or more computer processors to carry out a method for creating an interface between a smart contract to be executed on a decentralized architecture and a user component, the method comprising:
receiving code corresponding to the smart contract, wherein the code corresponding to the smart contract is at least one of byte code and source code;
parsing an application binary interface (ABI) corresponding to the smart contract;
constructing an enhanced application binary interface (EABI) based on the ABI, the EABI having at least one of a different data structure and additional metadata as compared to the ABI; and
creating a REST Application Programming Interface (API) specific to the smart contract based on the EABI.

22. The media of claim 21, wherein the code corresponding to the smart contract is the source code, the method further comprising the interface server compiling the source code into executable code and the ABI.

23. The media of claim 21, wherein the REST API includes one or more of a method for retrieving parameter properties, a method for setting parameter properties, a method for retrieving function properties, and/or a method for setting function properties.

24. The media of claim 21, the enhanced ABI is constructed based on a solc ABI, solc developer documentation, solc user documentation and wherein the additional metadata is stored in a database of the interface server.

25. The media of claim 21, wherein the enhanced ABI is a data structure object with four top-level types, each representing one of constructor constructs, fallback constructs, function constructs or event constructs, wherein each type of construct has a different purpose and different metadata parameters which describe the construct.

26. The media of claim 24, wherein the additional metadata includes a field for enabling caching of method calls.

27. The media of claim 24, wherein the additional metadata includes a field for enabling summarization of multiple signature requests into a single transaction.

28. The media of claim 21, further comprising the interface server applying metadata describing attributes of the smart contract, methods of the smart contract, and input and output parameters of the methods to adjust parameter properties before the parameters are submitted to a blockchain, and adjust a return value from the blockchain.

29. The media of claim 21, wherein the REST API permits a multisig transaction by wrapping an unsigned transaction in the multisig transaction.

30. The media of claim 21, wherein the REST API permits smart contract events to be queried and retrieved based on parameters in the query.

* * * * *